United States Patent
Chen et al.

(10) Patent No.: US 9,667,942 B2
(45) Date of Patent: May 30, 2017

(54) ADAPTIVE LUMINANCE COMPENSATION IN THREE DIMENSIONAL VIDEO CODING

(71) Applicant: QUALCOMM Incorporated, San Diego, CA (US)

(72) Inventors: Ying Chen, San Diego, CA (US); Jewon Kang, San Diego, CA (US); Li Zhang, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 863 days.

(21) Appl. No.: 14/084,347

(22) Filed: Nov. 19, 2013

(65) Prior Publication Data

US 2014/0139627 A1    May 22, 2014

Related U.S. Application Data

(60) Provisional application No. 61/728,739, filed on Nov. 20, 2012, provisional application No. 61/750,321, filed on Jan. 8, 2013.

(51) Int. Cl.
| | |
|---|---|
| *H04N 13/00* | (2006.01) |
| *H04N 19/105* | (2014.01) |
| *H04N 19/176* | (2014.01) |
| *H04N 19/597* | (2014.01) |

(Continued)

(52) U.S. Cl.
CPC ....... *H04N 13/0048* (2013.01); *H04N 19/105* (2014.11); *H04N 19/176* (2014.11); *H04N 19/597* (2014.11); *H04N 19/61* (2014.11); *H04N 19/70* (2014.11)

(58) Field of Classification Search
CPC ............. H04N 13/0048; H04N 19/105; H04N 19/176; H04N 19/597; H04N 19/61; H04N 19/70
See application file for complete search history.

(56) References Cited

U.S. PATENT DOCUMENTS

| | | |
|---|---|---|
| 5,805,227 A | 9/1998 | Gi-Hwan |
| 8,284,837 B2 | 10/2012 | Yin et al. |
| 2012/0106646 A1 | 5/2012 | Cammas et al. |

FOREIGN PATENT DOCUMENTS

WO    2011124676 A1    10/2011

OTHER PUBLICATIONS

Mishuroyskiy, "CE2.A Results on Inter-View coding with Adaptive Luminance Compensation," Joint Collaborative Team on 3D Video Coding Extension Development of ITU-T SG 16 WP 3 and ISO/IEC JTC 1/SC 29/WG 11, Shanghai, CN, Oct. 2012.*

(Continued)

*Primary Examiner* — Thai Tran
*Assistant Examiner* — Christopher T Braniff
(74) *Attorney, Agent, or Firm* — Shumaker & Sieffert, P.A.

(57) ABSTRACT

A method of coding video data includes deriving prediction weights for illumination compensation of luma samples of a video block partition once for the video block partition such that the video block partition has a common set of prediction weights for performing illumination compensation of the luma samples regardless of a transform size for the video block partition, calculating a predicted block for the video block partition using the prediction weights using illumination compensation, and coding the video block partition using the predicted block.

66 Claims, 8 Drawing Sheets

(51) Int. Cl.
*H04N 19/61* (2014.01)
*H04N 19/70* (2014.01)

(56) References Cited

OTHER PUBLICATIONS

Hannuksela, et al., "3D-AVC Draft Text 3," Document JCT3V-A1002, Jul. 16-20, 2012; Joint Collaborative Team on 3D Video Coding Extension Development of ITU-T SG 16 WP 3 and ISO/IEC JTC 1/SC 29/WG 11, 1st Meeting: Stockholm, SE, Sep. 13, 2012, 68 pp.
Bossen et al., "Video Coding Using a simplified Block Structure and Advanced Coding Techniques," IEEE Transactions on Circuits and Systems for Video Technology, vol. 20, No. 12, Dec. 2010, pp. 1667-1675.
Bross et al., "High efficiency video coding (HEVC) text specification draft 10 (for FDIS & Last Call)," 12th Meeting: Geneva, CH, Jan. 14-23, 2013, JCTVC-L1003_v34, 310 pp.
Bross et al., "High efficiency video coding (HEVC) text specification draft 7," 9th Meeting: Geneva, CH, Apr. 27-May 7, 2012, JCTVC-I1003_d2, 290 pp.
Bross et al., "High efficiency video coding (HEVC) text specification draft 8," 10th Meeting: Stockholm, SE, Jul. 11-20, 2012, JCTVC-J1003_d7, 261 pp.
Bross et al., "High efficiency video coding (HEVC) text specification draft 6," 8th Meeting: San Jose, CA, USA, Feb. 1-10, 2012, JCTVC-H1003, 259 pp.
Bross et al., "High efficiency video coding (HEVC) text specification draft 9," 11th Meeting: Shanghai, CN, Oct. 10-19, 2012, JCTVC-K1003_v7, 290 pp.
Bross et al., "WD4: Working Draft 4 of High-Efficiency Video Coding," 6th Meeting: JCTVC-F803_d2, Torino, IT, Jul. 14-22, 2011, 226 pp.
Bross et al., "WD5: Working Draft 5 of High-Efficiency Video Coding," 7th Meeting: Geneva, Switzerland, Nov. 21-30, 2011, JCTVC-G1103_d2, 214 pp.
Fartukov et al., "3D-CE1.a results on inter-view coding with adaptive luminance compensation by Samsung," JCT-3V Meeting; MPEG Meeting;Stockholm; (The Joint Collaborative Team on 3D Video Coding Extension Development of ISO/IEC JTC1/SC29/WG11 and ITU-T SG.16); URL: http://phenix.int-evry.fr/jct2/,, No. JCT3V-A0015, Jul. 16-20, 2012, 16 pp.
Hannuksela et al., "3D-AVC draft text 4," JCT-3V Meeting; MPEG Meeting; Shanghai; (The Joint Collaborative Team on 3D Video Coding Extension Development of ISO/IEC JTC1/SC29/WG11 and ITU-T SG.16); URL: http://phenix.int-evry.fr/jct2/,, No. JCT3V-B1002, Oct. 13-19, 2012, 70 pp.
International Preliminary Report on Patentability—PCT/US2013/070957, The International Bureau of WIPO—Geneva, Switzerland, Feb. 13, 2015, 6 pp.
International Search Report and Written Opinion—PCT/US2013/070957—ISA/EPO—Apr. 25, 2014, 13 pp.
ITU-T H.264, Series H: Audiovisual and Multimedia Systems, Infrastructure of audiovisual services—Coding of moving video, Advanced video coding for generic audiovisual services, The International Telecommunication Union. Jun. 2011, 674 pp.
Mishurovskiy et al., "3D-CE2.a results on inter-view coding with adaptive luminance compensation," JCT-3V Meeting; MPEG Meeting; Shanghai; (The Joint Collaborative Team on 3D Video Coding Extension Development of ISO/IEC JTC1/SC291WG11 and ITU-T SG.16 ); URL: http://phenix.int-evry.fr/jct2/,, No. JCT3V-B0031, Oct. 13-19, 2012, 24 pp.
Peng et al., "An Inter-Frame Prediction Technique Combining Template Matching Prediction and Block Motion Compensation for High Efficiency Video Coding," IEEE, 2013, pp. 1-14.
Wiegand et al., "WD2: Working Draft 2 of High-Efficiency Video Coding," JCTVC-D503, 4th Meeting: Daegu, KR, Jan. 20-28, 2011, 153 pp.
Wiegand et al., "WD3: Working Draft 3 of High-Efficiency Video Coding," Document JCTVC-E603, 5th Meeting: Geneva, CH, Mar. 16-23, 2011, 193 pp.
Wiegand et al., "WD1: Working Draft 1 of High-Efficiency Video Coding", JCTVC-C403, 3rd Meeting: Guangzhou, CN, Oct. 7-15, 2010, 137 pp.
ITU-T H.265, Series H: Audiovisual and Multimedia Systems, Infrastructure of audiovisual services—Coding of moving video, High efficiency video coding, The International Telecommunication Union, Apr. 2013, 317 pp.
Hannuksela et al., "3D-AVC Draft Text 5," JCT-3V Meeting; MPEG Meeting; Geneva; (The Joint Collaborative Team on 3D Video Coding Extension Development of ISO/IEC JTC1/SC291WG11 and ITU-T SG.16); URL: http://phenix.int-evry.fr/jct2/,, No. JCT3V-C1002, Jan. 17-23, 2013, 82 pp.
Bross et al., "High efficiency video coding (HEVC) text specification draft 9," 11th Meeting: Shanghai, CN, Oct. 10-19, 2012, JCTVC-K1003_v9, 292 pp.
Second Written Opinion of International Application No. PCT/US2013/070957, mailed Dec. 15, 2014, 6 pp.

\* cited by examiner

ADAPTIVE LUMINANCE COMPENSATION IN THREE DIMENSIONAL VIDEO CODING

This application claims the benefit of U.S. Provisional Application No. 61/728,739 filed 20 Nov. 2012, and U.S. Provisional Application No. 61/750,321 filed 8 Jan. 2013, the entire contents of each of which are hereby incorporated by reference.

TECHNICAL FIELD

This disclosure relates to video coding and, more particularly, three-dimensional video coding (3DVC).

BACKGROUND

Digital video capabilities can be incorporated into a wide range of devices, including digital televisions, digital direct broadcast systems, wireless broadcast systems, personal digital assistants (PDAs), laptop or desktop computers, tablet computers, e-book readers, digital cameras, digital recording devices, digital media players, video gaming devices, video game consoles, cellular or satellite radio telephones, so-called "smart phones," video teleconferencing devices, video streaming devices, and the like. Digital video devices implement video compression techniques, such as those described in the standards defined by MPEG-2, MPEG-4, ITU-T H.263, ITU-T H.264/MPEG-4, Part 10, Advanced Video Coding (AVC), the High Efficiency Video Coding (HEVC) standard presently under development, and extensions of such standards. The video devices may transmit, receive, encode, decode, and/or store digital video information more efficiently by implementing such video compression techniques.

Video compression techniques perform spatial (intra-picture) prediction and/or temporal (inter-picture) prediction to reduce or remove redundancy inherent in video sequences. For block-based video coding, a video slice (i.e., a picture or a portion of a picture) may be partitioned into video blocks, which may also be referred to as treeblocks, coding units (CUs) and/or coding nodes. Video blocks in an intra-coded (I) slice of a picture are encoded using spatial prediction with respect to reference samples in neighboring blocks in the same picture. Video blocks in an inter-coded (P or B) slice of a picture may use spatial prediction with respect to reference samples in neighboring blocks in the same picture or temporal prediction with respect to reference samples in other reference pictures.

Spatial or temporal prediction results in a predictive block for a block to be coded. Residual data represents pixel differences between the original block to be coded and the predictive block. An inter-coded block is encoded according to a motion vector that indicates the location of a block of reference samples forming the predictive block, and the residual data indicating the difference between the coded block and the predictive block. An intra-coded block is encoded according to an intra-coding mode and the residual data. For further compression, the residual data may be transformed from the pixel domain to a transform domain, resulting in residual transform coefficients, which then may be quantized. The quantized transform coefficients, initially arranged in a two-dimensional array, may be scanned in order to produce a one-dimensional vector of transform coefficients, and entropy coding may be applied to achieve even more compression.

SUMMARY

In general, this disclosure describes techniques for performing three-dimensional video coding using a 3D extension of the H.264/Advanced Video Coding (AVC) standard, referred to as 3D-AVC. The 3D extension defines a video coding technology for encoding multiple views of video data, such as left and right eye views with depth data. Each view may correspond to a different perspective, or angle, at which corresponding video data of a common scene was captured. In the context of 3D H.264/AVC, each view may contain a texture view and a depth view. A coded representation of a view in one time instance is a view component. A view component may contain a depth view component and a texture view component.

In 3D-AVC, a video encoder may perform a technique referred to as "illumination compensation." Illumination compensation techniques adjust or normalize the illumination or "luma" sample values for a current block based on the differences of previously coded luma samples of the current view and luma samples from another view. By normalizing luma values between different views, a video encoder may better predict the values of similar or luma samples as compared with un-compensated luma values. However, current techniques for performing illumination compensation in 3D-AVC may incur high computational complexity and/or may be incompatible with existing H.264/AVC decoder implementations in some cases. The techniques of this disclosure generally relate to techniques for reducing the computational complexity and improving compatibility for a video coder configured to perform illumination compensation in 3D-AVC.

In one example, a method of decoding video data includes deriving prediction weights for illumination compensation of luma samples of a video block partition once for the video block partition such that the video block partition has a common set of prediction weights for performing illumination compensation of the luma samples regardless of a transform size for the video block partition, calculating a predicted block for the video block partition using the prediction weights using illumination compensation, and decoding the video block partition using the predicted block.

In another example, a of encoding video data includes deriving prediction weights for illumination compensation of luma samples of a video block partition once for the video block partition such that the video block partition has a common set of prediction weights for performing illumination compensation of the luma samples regardless of a transform size for the video block partition. The method further includes calculating a predicted block for the video block partition using the prediction weights using illumination compensation, and encoding the video block partition using the predicted block.

In another example, a device comprising a video coder is configured to derive prediction weights for illumination compensation of luma samples of a video block partition once for the video block partition such that the video block partition has a common set of prediction weights for performing illumination compensation of the luma samples regardless of a transform size for the video block partition. The device is further configured to calculate a predicted block for the video block partition using the prediction weights using illumination compensation and code the video block partition using the predicted block.

In another example, a non-transitory computer-readable storage medium comprising instructions that, when executed, cause one or more processor to derive prediction weights for illumination compensation of luma samples of a video block partition once for the video block partition such that the video block partition has a common set of prediction weights for performing illumination compensation of the luma samples regardless of a transform size for the video block partition. The storage medium further comprises instructions that, when executed, cause the at least one processor to calculate a predicted block for the video block partition using the prediction weights using illumination compensation, and code the video block partition using the predicted block.

In another example, a device for coding video data includes means for deriving prediction weights for illumination compensation of luma samples of a video block partition once for the video block partition such that the video block partition has a common set of prediction weights for performing illumination compensation of the luma samples regardless of a transform size for the video block partition, means for calculating a predicted block for the video block partition using the prediction weights using illumination compensation, and means for encoding the video block partition using the predicted block.

The details of one or more aspects of the disclosure are set forth in the accompanying drawings and the description below. Other features, objects, and advantages of the techniques described in this disclosure will be apparent from the description and drawings, and from the claims.

DETAILED DESCRIPTION

Figure 1:
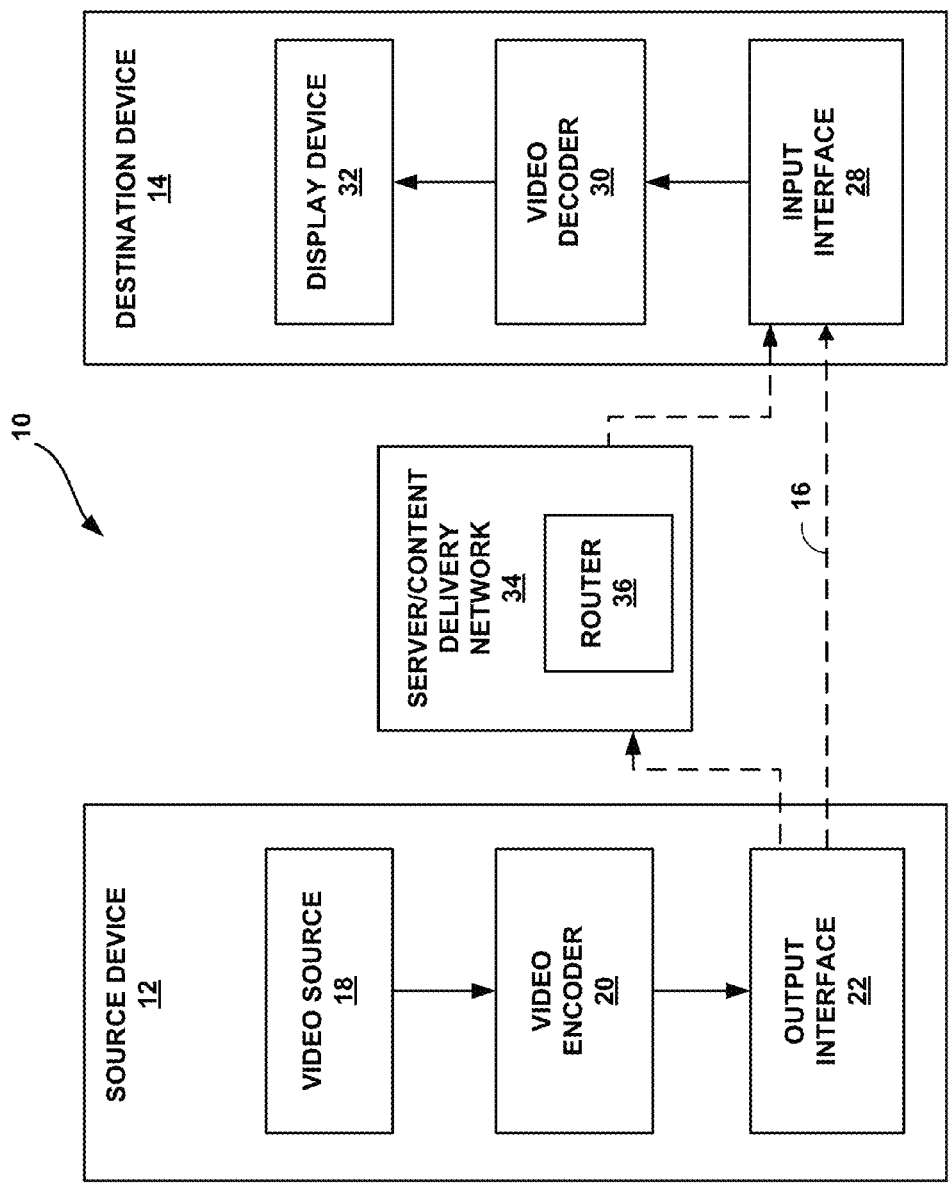
FIG. 1 is a block diagram illustrating an example video encoding and decoding system 10 that may be configured to perform adaptive illumination compensation in accordance with the techniques of this disclosure.

According to certain video coding systems, motion estimation and motion compensation may be used to reduce the temporal redundancy in a video sequence, so as to achieve data compression. In this case, a motion vector can be generated that identifies a predictive block of video data, e.g., a block from another video picture or slice, which can be used to predict the values of the current video block being coded. The values of the predictive video block are subtracted from the values of the current video block to produce a block of residual data. Motion information (e.g., a motion vector, motion vector indexes, prediction directions, or other information) is communicated from a video encoder to a video decoder, along with the residual data. The decoder can locate the same predictive block (based on the motion vector) and reconstruct the encoded video block by combining the residual data with the data of the predictive block.

Three-Dimensional H.264/AVC (3D-AVC) is a video coding process for coding multiple views of video data for producing a three-dimensional effect, e.g., using a left eye view and a right eye view. In general, each view corresponds to a different perspective, or angle, at which corresponding video data of a common scene was captured (or generated). A 3D-AVC extension to the ITU-T H.264/AVC standard is presently under development. A working draft of an amendment to the H.264/AVC standard to add the 3DVC extension is described in "3D-AVC Draft Text 5," ISO/IEC/JTC1/SC29/WG11/JCT3V-C1002, Geneva, Switzerland, dated January 2013 ("3D-AVC WD 5"). The 3D-AVC extension defines techniques for coding views to support display of 3D video data.

For example, in 3D video, two views (e.g., left and right eye views of a human viewer) may be displayed simultaneously or near simultaneously using different polarizations of light, and a viewer may wear passive, polarized glasses such that each of the viewer's eyes receives a respective one of the views. Alternatively, the viewer may wear active glasses that shutter each eye independently, and a display may rapidly alternate between images of each eye in synchronization with the glasses.

While each view (e.g., left and right eye views) may be individually coded, in 3D-AVC, one of the views is reconstructed from the other view using a depth component of a reference view. To illustrate, a depth map of a particular picture of a view (where this particular picture of a view may be referred to as a "view component" of the view) may be computed as a difference between the left eye view and the right eye view. The encoder may encode the left eye view, for example, as a so-called "texture component" of the view component and the depth map may be encoded as a so-called "depth component" of the view component.

The decoder may then decode the texture component of the view component and the depth component of the view component and reconstruct the right eye view from the texture component (which represents the left eye view) using the depth component. By encoding only one view and a corresponding depth map in this manner, 3D-AVC may more efficiently encode both the left eye and right eye view in comparison to encoding both the left eye view and the right eye view independently as separate views of the 3D-AVC data.

3D-AVC also exploits inter-component dependencies between texture and depth components of 3D video. To exploit these inter-dependencies, 3D-AVC introduces joint coding of texture and depth data. In 3D-AVC, base view is associated with a depth map, which indicates the depth of various regions of a frame of video data. To exploit inter-component dependencies, the depth component of the base view is coded with information extracted from the coded texture view. On the otherhand, the coding order of the texture view components and depth view components is flexible. Dependent texture views are coded with information available from associated depth which is coded prior to the texture in a depth-first-coding configuration, whereas texture views are coded prior to the depth in a texture-first-coding configuration.

3D-AVC is built upon the H.264/AVC video coding standard, and an H.264/AVC-compliant video coder may be able to code a base view (e.g., views corresponding to one eye) of a 3D-AVC video stream, but may not be able to code other views or depth components of the video data. As part of supporting the underlying H.264/AVC standard, a 3D-AVC-compliant video coder may perform inter-prediction to predict the luma (brightness) and chroma (color) components of a block of video data. During inter-prediction, the video coder determines a predictive block based on a previously-coded reference block from a different frame than the current block.

3D-AVC extends the concept of inter-prediction further by allowing inter-view prediction, in which a video coder predicts luma or chroma values for the current block based on values from a reference block from a previously block of a different view. However, due to a number of different factors, the luminance (luma) values of corresponding or similar blocks may vary between different views. When performing inter-view prediction, a 3D-AVC video coder (e.g., an encoder or a decoder) may perform luminance compensation in order to adjust for this inter-view luminance variation. The process of performing luminance compensation may be referred to as "adaptive luminance compensation" (ALC), also referred to as "illumination compensation."

When performing ALC, a 3D-AVC video coder determines luma samples from top- and left-neighboring blocks in the same frame as the current block, and luma samples from top- and left-neighboring blocks relative to the reference block from another view. The reference block may be identified by a disparity vector for the current block. The video coder compares the neighboring luma samples to the luma samples of the current block, and if the values of the samples vary too greatly, adjusts the predictive luma samples from the reference block based on a weighted difference between the sets of neighboring samples and the predictive luma samples for the current block.

In 3D-AVC, as with H.264/AVC, a frame of video is divided into macroblocks. Each macroblock may be further divided into macroblock partitions, and those macroblock partitions may be further divided into sub-partitions. When performing ALC, a compliant video coder may perform motion compensation for each sub-partition of a macroblock to determine the left- and top-neighboring inter-view luma samples for ALC. In some cases, macroblock sub-partitions and macroblock partitions may have the exact same motion vector, which indicates a predictive inter-view reference block of luma samples. Performing motion compensation multiple times even when each sub-partition has the same motion vector may be computationally expensive. Additionally, block sizes for performing motion compensation in conjunction with ALC may be incompatible with existing H.264/AVC video decoder implementations for performing motion compensation.

Example techniques of this disclosure may be used to reduce the computational complexity of performing illumination compensation. For instance, in accordance with the techniques of this disclosure, a video coder (e.g., a video encoder or a video decoder) may derive a single set of weights based on the same sets of left- and top-neighboring inter-view luma samples for each partition or sub-partition of a macroblock, and use the same set of weights when performing ALC on a macroblock partition or a sub-partition. In some examples, a video coder may also be configured to reduce or round the precision of the motion vector that indicates the position of the inter-view reference block relative to the current block in order to reduce the computational complexity of performing motion compensation in a sub-pel during ALC. In some other examples, a video coder in accordance with the techniques of this disclosure may also be configured to select top- and/or left-neighboring luma sample regions having reduced or different sizes of luma samples when performing ALC.

The following description should be understood to be in the context of 3D-AVC, where reference to 3D-AVC is understood to reference to H.264/AVC. That is, given that 3D-AVC is an extension to H.264, and 3D-AVC is a further extension of H.264/AVC, 3D-AVC incorporates or otherwise may be considered to "inherit" all aspects of H.264/AVC. In other words, in some examples, the techniques may provide for generation of a 3D-AVC bitstream that is backwards compatible with H.264/AVC (or, in other words, capable of being decoded by a video decoder that does not support 3D-AVC but that does support H.264/AVC). While the following techniques are each described in the context of 3D-AVC, these techniques may be extended in some instances to other ways of coding 3D video data having both texture view components and depth view components. For instance, the techniques of this disclosure may be applied in the context of three-dimensional extensions to other video coding standards, such as the High Efficiency Video Coding (HEVC) standard, e.g., 3D-HEVC.

FIG. 1 is a block diagram illustrating an example video encoding and decoding system 10 that may be configured to perform adaptive illumination compensation in accordance with the techniques of this disclosure. As shown in FIG. 1, system 10 includes a source device 12 that provides encoded video data to be decoded at a later time by a destination device 14. In particular, source device 12 provides the video data to destination device 14 via a computer-readable medium 16. Source device 12 and destination device 14 may comprise any of a wide range of devices, including desktop computers, notebook (i.e., laptop) computers, tablet computers, slate computers, set-top boxes, telephone handsets such as so-called "smart" phones, so-called "smart" pads, televisions, cameras, display devices, digital media players, video gaming consoles, video streaming device, or the like. In some cases, source device 12 and destination device 14 may be equipped for wireless communication.

Destination device 14 may receive the encoded video data to be decoded via computer-readable medium 16. Computer-readable medium 16 may comprise any type of medium or device capable of transferring the encoded video data from source device 12 to destination device 14. In one example, computer-readable medium 16 may comprise a communication medium to enable source device 12 to transmit encoded video data directly to destination device 14 in real-time or near real-time.

The encoded video data may be modulated according to a communication standard, such as a wireless communication protocol, and transmitted to destination device 14. The communication medium may comprise any wireless or wired communication medium, such as a radio frequency (RF) spectrum or one or more physical transmission lines. The communication medium may form part of a packet-based network, such as a local area network, a wide-area network, or a global network such as the Internet. The communication medium may include routers, switches, base stations, or any other equipment that may be useful to facilitate communication from source device 12 to destination device 14.

In some examples, encoded data may be output from transmitter 24 of source device 24 to a storage device. Similarly, encoded data may be accessed from the storage device by receiver 26 of destination device 14. The storage device may include any of a variety of distributed or locally accessed data storage media such as a hard drive, Blu-ray discs, DVDs, CD-ROMs, flash memory, volatile or non-volatile memory, or any other suitable digital storage media for storing encoded video data. In a further example, the storage device may correspond to a file server or another intermediate storage device that may store the encoded video generated by source device 12.

Destination device 14 may access stored video data from the storage device via streaming or download. The file server may be any type of server capable of storing encoded video data and transmitting that encoded video data to the destination device 14. Example file servers include a web server (e.g., for a website), an FTP server, network attached storage (NAS) devices, or a local disk drive. Destination device 14 may access the encoded video data through any standard data connection, including an Internet connection. This may include a wireless channel (e.g., a Wi-Fi connection), a wired connection (e.g., DSL, cable modem, etc.), or a combination of both that is suitable for accessing encoded video data stored on a file server. The transmission of encoded video data from the storage device may be a streaming transmission, a download transmission, or a combination thereof.

The techniques of this disclosure are not necessarily limited to wireless applications or settings. The techniques may be applied to video coding in support of any of a variety of multimedia applications, such as over-the-air television broadcasts, cable television transmissions, satellite television transmissions, Internet streaming video transmissions, such as dynamic adaptive streaming over HTTP (DASH), digital video that is encoded onto a data storage medium, decoding of digital video stored on a data storage medium, or other applications. In some examples, system 10 may be configured to support one-way or two-way video transmission to support applications such as video streaming, video playback, video broadcasting, and/or video telephony.

In the example of FIG. 1, source device 12 includes a video source 18, a video encoder 20, an encapsulation unit 21, and an output interface 22. Destination device 14 includes input interface 28, decapsulation unit 29, video decoder 30, and display device 32. In some examples, source device 12 and destination device 14 may include other components or arrangements. For example, source device 12 may receive video data from an external video source 18, such as an external camera. Likewise, destination device 14 may interface with an external display device, rather than including integrated display device 32.

The illustrated system 10 of FIG. 1 is merely one example. The techniques of this disclosure related to ALC may be performed by any digital video encoding and/or decoding device. Although generally the techniques of this disclosure are performed by a video encoding device, the techniques may also be performed by a video encoder/decoder, typically referred to as a "CODEC." Moreover, the techniques of this disclosure may also be performed by a video preprocessor. Source device 12 and destination device 14 are merely examples of such coding devices in which source device 12 generates coded video data for transmission to destination device 14. In some examples, devices 12, 14 may operate in a substantially symmetrical manner such that each of devices 12, 14 include video encoding and decoding components. Hence, system 10 may support one-way or two-way video transmission between video devices 12, 14, e.g., for video streaming, video playback, video broadcasting, or video telephony.

Video source 18 of source device 12 may include a video capture device, such as a video camera, a video archive containing previously captured video, and/or a video feed interface to receive video from a video content provider. As a further alternative, video source 18 may generate computer graphics-based data as the source video, or a combination of live video, archived video, and computer-generated video. In some cases, if video source 18 is a video camera, source device 12 and destination device 14 may form so-called camera phones or video phones. As mentioned above, however, the techniques described in this disclosure may be applicable to video coding in general, and may be applied to wireless and/or wired applications. In each case, the captured, pre-captured, or computer-generated video may be encoded by video encoder 20. The encoded video information may then be output by output interface 22 onto a computer-readable medium 16.

Video source 18 may generally provide a plurality of views of a scene to video encoder 20, such as a left and right eye view corresponding to 3D video, to video encoder 20. Video source 18 may also provide information indicative of locations of camera perspectives for the views.

Computer-readable medium 16 may include transient media, such as a wireless broadcast or wired network transmission, or storage media (that is, non-transitory storage media), such as a hard disk, flash drive, compact disc, digital video disc, Blu-ray disc, or other computer-readable media. In some examples, a network server (not shown) may receive encoded video data from source device 12 and provide the encoded video data to destination device 14, e.g., via network transmission. Similarly, a computing device of a medium production facility, such as a disc stamping facility, may receive encoded video data from source device 12 and produce a disc containing the encoded video data. Therefore, computer-readable medium 16 may be understood to include one or more computer-readable media of various forms, in various examples.

Input interface 28 of destination device 14 receives information from computer-readable medium 16. The information of computer-readable medium 16 may include syntax information defined by video encoder 20, which is also used by video decoder 30, that includes syntax elements that describe characteristics and/or processing of blocks and other coded units, e.g., GOPs. Decapsulation unit 29 of destination device 14 may represent a unit that decapsulates SEI messages from a bitstream (or a subset of a bitstream referred to as an "operation point" in the context of 3D-AVC). Decapsulation unit 29 may perform operations in an order opposite those performed by encapsulation unit 29 to decapsulate data from the encapsulated encoded bitstream, such as SEI messages. Display device 32 displays the decoded video data to a user, and may comprise any of a variety of display devices such as a cathode ray tube (CRT), a liquid crystal display (LCD), a plasma display, an organic light emitting diode (OLED) display, or another type of display device.

Video encoder 20 and video decoder 30 each may be implemented as any of a variety of suitable encoder or decoder circuitry, as applicable, such as one or more microprocessors, digital signal processors (DSPs), application specific integrated circuits (ASICs), field programmable gate arrays (FPGAs), discrete logic circuitry, software, hardware, firmware or any combinations thereof. Each of video encoder 20 and video decoder 30 may be included in one or more encoders or decoders, either of which may be integrated as part of a combined video encoder/decoder (CODEC). A device including video encoder 20 and/or video decoder 30 may comprise an integrated circuit, a microprocessor, and/or a wireless communication device, such as a cellular telephone.

Although not shown in FIG. 1, in some aspects, video encoder 20 and video decoder 30 may each be integrated with an audio encoder and decoder, and may include appropriate MUX-DEMUX units, or other hardware and software, to handle encoding of both audio and video in a common data stream or separate data streams. If applicable, MUX-DEMUX units may conform to the ITU H.223 multiplexer protocol, or other protocols such as the user datagram protocol (UDP).

In the example shown in FIG. 1, system 10 also includes server/content delivery network 34 having router 36. In some examples, source device 12 may communicate with server/content delivery network 34 via a variety of wireless and/or wired transmission or storage media, as described above. Moreover, while shown separately in the example of FIG. 1, in some examples, source device 12 and server/content delivery network 34 comprise the same device. Server/content delivery network 34 may store one or more versions of coded video data (from video encoder 20 of source device 12), and may make such coded video data available for access by destination device 14 and video decoder 30. In some examples, router 36 may be responsible for providing coded video data to destination device 14 in a requested format.

Video encoder 20 and video decoder 30 may operate according to a video coding standard, such as the ITU-T H.264 standard, alternatively referred to as MPEG-4, Part 10, Advanced Video Coding (AVC), or extensions of such standards, including the MVC extension and/or 3D-AVC extension to H.264. The techniques of this disclosure, however, are not limited to any particular coding standard. Other examples of video coding standards include MPEG-2, ITU-T H.263, and HEVC (ITU-T H.265).

The ITU-T H.264/MPEG-4 (AVC) standard was formulated by the ITU-T Video Coding Experts Group (VCEG) together with the ISO/IEC Moving Picture Experts Group (MPEG) as the product of a collective partnership known as the Joint Video Team (JVT). In some aspects, the techniques described in this disclosure may be applied to devices that generally conform to the H.264 standard. The H.264 standard is described in ITU-T Recommendation H.264, Advanced Video Coding for generic audiovisual services, by the ITU-T Study Group, and dated March, 2005, which may be referred to herein as the H.264 standard or H.264 specification, or the H.264/AVC standard or specification. H.264/AVC includes a scalable video coding (SVC) extensions and MVC extensions. In addition, there is further development to provide a 3D-AVC extension, making use of coding texture data and depth map data at different spatial resolutions. The Joint Video Team (JVT) continues to work on extensions to H.264/MPEG-4 AVC. While described within the context of 3D-AVC, the techniques described in this disclosure may be implemented with respect to other video coding algorithms capable of encoding and decoding 3D video involving both texture and depth components.

Video encoder 20 may code syntax data, such as block-based syntax data, picture-based syntax data, and GOP-based syntax data, which video decoder 30 may ultimately receive, e.g., in a picture header, a block header, a slice header, or a GOP header. The GOP syntax data may describe a number of pictures in the respective GOP, and the picture syntax data may indicate an encoding/prediction mode used to encode the corresponding picture.

In some examples, video encoder 20 may generate and video decoder 30 may receive certain parameter sets, which may be used when decoding video data. For example, parameter sets may contain sequence-level header information (in sequence parameter sets (SPS)) and the infrequently changing picture-level header information (in picture parameter sets (PPS)). With parameter sets (e.g., PPS and SPS), infrequently changing information need not to be repeated for each sequence (e.g., sequence of pictures) or picture; hence coding efficiency may be improved. Furthermore, the use of parameter sets may enable out-of-band transmission of the important header information, avoiding the need for redundant transmissions for error resilience. In out-of-band transmission examples, parameter set NAL units may be transmitted on a different channel than other NAL units, such as Supplemental Enhancement Information (SEI) NAL units.

SEI NAL units (referred to as SEI messages) may contain information that is not necessary for decoding the coded pictures samples from video coding layer (VCL) NAL units, but may assist in processes related to decoding, display, error resilience, and other purposes. SEI messages may be contained in non-VCL NAL units. SEI messages may be included in the normative part of some standard specifications, and thus are not always mandatory for standard compliant decoder implementation. SEI messages may be sequence level SEI messages or picture level SEI messages. Some sequence level information may be contained in SEI messages, such as scalability information SEI messages in the example of SVC and view scalability information SEI messages in MVC. View scalability information SEI messages also may provide sequence level information for the 3D-AVC extension to H.264.

In some examples, video encoder 20 may code a 3D-AVC bitstream that conforms to the 3D-AVC extension of H.264, which may include texture data and depth data at different spatial resolutions, and specifically depth data at a lower resolution as compared to the texture data resolution. In accordance with the techniques of this disclosure, video encoder 20 and video decoder 30 may be configured to perform adaptive luminance compensation in accordance with the techniques of this disclosure.

As described above, certain techniques for performing adaptive luminance compensation may result in high computational complexity and/or incompatibility with existing H.264/AVC video decoders. In some ALC implementations, which may have relatively higher computational complexity as compared to the techniques of this disclosure, video encoder 20 and video decoder 30 may perform motion compensation once for each macroblock sub-partition. To reduce the computational complexity of performing ALC, video encoder 20 may video decoder 30 may perform motion compensation only once for each macroblock partition.

For instance, video encoder 20 and video decoder 30 may be configured to derive prediction weights for illumination compensation of luminance (luma) samples of a video block partition once for the video block partition such that the video block partition has a common set of prediction weights for performing illumination compensation of the luma samples regardless of a transform size for the video block partition, calculate a predicted block for the video block partition using the prediction weights using illumination compensation, and code the video block partition using the predicted block.

The video block partition may comprise a partition of a macroblock. For example, the video block partition may comprise an 8×16, 16×8, 8×8, or other partition size of the macroblock. Rather than determining prediction weights for each 4×4 block of the video block partition, video encoder 20 and video decoder 30 may determine prediction weights for illumination compensation only once for the video block partition. Furthermore, if the macroblock includes a plurality (e.g., two or more) video block partitions, each of the partitions may have a common set of prediction weights, regardless of transform sizes for the macroblock. The transform size may be, for example, 4×4. In another example, a macroblock contains a single set of prediction weight derived once for the macroblock regardless of a macroblock partition and transform sizes.

As discussed above, illumination compensation can be used when calculating a predicted block for a video block partition. For instance, video encoder 20 and video decoder 30 may determine an inter-view reference block for the video block partition using, e.g., disparity motion compensation. Moreover, using the common set of prediction weights, video encoder 20 and video decoder 30 may modify values of the inter-view reference block by performing illumination compensation. Then, video encoder 20 and video decoder 30 may code the video block partition using the predicted block that underwent illumination compensation. For instance, video encoder 20 may calculate residual data for the video block partition, transform and quantize the residual data, and entropy encode the transformed, quantized residual data. Video decoder 30, similarly, may entropy decode transformed, quantized residual data, inverse quantize and inverse transform the residual data to reproduce the residual data in the spatial domain, and combine the residual data with predicted data for the video block partition to reproduce (i.e., decode) the video block partition. Video encoder 20 or video decoder 30 may perform the luminance compensation in the motion compensation in the encoding and decoding process.

Generally, a video coder, such as video encoder 20 or video decoder 30, that is compliant with 3D-AVC may be configured to perform ALC based on syntax data coded in a video stream. Video encoder 20 or video decoder 30 may be configured to perform ALC when a block of video data is inter-view predicted from a block of a different view. When the current block is inter-view predicted, video encoder 20 or video decoder 30 performs motion estimation and motion compensation to determine a motion vector indicative of a corresponding reference block from a different view relative to the current view.

To perform ALC, the video coder first determines a predictive block of luma samples. The video coder then determines blocks of neighboring luma samples relative to the current block of video data that the coder is coding. The video coder determines a top-neighboring block and a left-neighboring block relative to the current block that is in the same frame (or picture) as the current block. The video coder also determines a reference block for the current block using a disparity motion vector. The top-neighboring block of luma samples relative to the reference block is denoted as "UTRef$_i$," and the left-neighboring block of luma samples relative to the reference block is denoted as "LTRef$_i$," where subscript-i indicates a particular macroblock partition or sub-partition index.

A video coder configured to perform ALC also determines top- and left-neighboring blocks of previously-decoded luma samples relative to the current block, i.e., in the same frame as the current block. The left-neighboring block of luma samples relative to the current block is denoted as "LTDec$_i$," and the top-neighboring block of luma samples is denoted as "UTDec$_i$."

After video encoder 20 or video decoder 30 determines luma samples: UTDec$_i$, LTDec$_i$, UTRef$_i$, and LTRef$_i$, for a particular macroblock partition, video encoder 20 or video decoder 30 compares the values of the luma samples of UTDec$_i$, LTDec$_i$, UTRef$_i$, and LTRef$_i$ against each other. More particularly, video encoder 20 or video decoder 30 may compare the corresponding luma samples of UTRet$_i$, LTRef$_i$, UTDec$_i$, and LTDec$_i$ against each other as follows:

$$Ref\_Dec_i = 1 + \sum_{k,m=[1\ldots 4, 1\ldots psy]} LTDec_i[k,m] \times \begin{cases} 1, & |LTDec_i[k,m] - LTRef_i[k,m]| < TH \\ 0, & \text{otherwise} \end{cases} + \tag{1}$$

$$(1) \sum_{k,m=[1\ldots psx, 1\ldots 4]} UTDec_i[k,m] \times \begin{cases} 1, & |UTDec_i[k,m] - UTRef_i[k,m]| < TH \\ 0, & \text{otherwise} \end{cases},$$

$$Ref\_Ref_i = 1 + \sum_{k,m=[1\ldots 4, 1\ldots psy]} LTRef_i[k,m] \times \begin{cases} 1, & |LTDec_i[k,m] - LTRef_i[k,m]| < TH \\ 0, & \text{otherwise} \end{cases} + \tag{2}$$

$$\sum_{k,m=[1\ldots psx, 1\ldots 4]} UTRef_i[k,m] \times \begin{cases} 1, & |UTDec_i[k,m] - UTRef_i[k,m]| < TH \\ 0, & \text{otherwise} \end{cases},$$

Equation 1 compares corresponding luma samples of LTDec$_i$ with the luma samples of LTRef$_i$ and produces a variable, "Ref_Dec$_i$," and adds the corresponding LTDec$_i$ sample to Ref_Dec$_i$ if the difference between the two samples is less than a threshold value (denoted as "TH," which is equal to 30 by default). Equation 1 also adds value of each sample of UTDec$_i$ to Ref_Dec$_i$ if the difference between UTDec$_i$ and UTRef$_i$ are less than TH.

Equation 2 is similar to equation 1, and adds the value of LTRef$_i$ [k,m] to the sum Ref_Ref$_i$ if the absolute value of the difference of LTDec$_i$ and LTRef$_i$ [k,m] is less than the threshold, TH. Equation 2 also adds the value of UTRef$_i$ [k,m] to Ref_Ref$_i$ if the difference in the absolute values of the difference between UTDec$_i$ [k,m]−UTRefi [k,m] is less than TH.

In both equations, the subscript "i" denotes the index of a particular macroblock partition or sub-partition. The variables "k" and "m" represent the x- and y-coordinates of a particular sample within UTDec$_i$, UTRef$_i$, LTDec$_i$ or LTRef$_i$ Equations 1 and 2 are described for illustrative purposes. In equations 1 and 2, UTDec$_i$, and UTRef$_i$ have a height of 4 pixels, and LTRef$_i$ and LTDec$_i$ have a width of four pixels. As will be described in greater detail below, in accordance with the techniques of this disclosure, other dimensions for UTDec$_i$, LTDec$_i$, UTRef$_i$, and LTRef$_i$ are also possible.

After calculating the values of Ref_Ref$_i$ and Ref_Dec$_i$, video encoder 20 or video decoder 30 determines a number of weight parameters that are used to adjust the predicted luma values of the current block. The predicted luma values for the current block are denoted as predPart$_i$. To calculate the weight parameters for ALC, a video coder first determines a value of a variable denoted as "W$_i$." W$_i$ is determined according to equation 3, below.

$$W_i = \begin{cases} 1, & \text{if } (\text{Ref\_Ref}_i \gg \text{CUT\_TH}) == (\text{Ref\_Dec}_i \gg \text{CUT\_TH}) \\ ((1 \ll LogWDC) \times \text{Ref\_Fef}_i + (\text{Ref\_Ref}_i \gg 1))/\text{Ref\_Ref}_i, & \text{otherwise} \end{cases} \quad (3)$$

In equation 3, ">>" indicates an arithmetic right shift, CUT_TH is a threshold with a value equal to four, and log WDC is another variable that is equal to 15. W$_i$ is equal to one if the arithmetic shift of Ref_Ref$_i$>>CUT_TH is equal to the arithmetic shift of Ref_Dec$_i$>>CUT_TH. W$_i$ is equal to ((1<<Log WDC)×Ref_Ref$_i$+Ref_Ref$_i$>>1) otherwise.

Based on the calculated value of W$_i$, the video coder determines the ALC-compensated luma values for the macroblock partition or sub-partition of the predicted block of luma samples for the current block. The ALC-compensated partition of luma values of the current block is denoted as predPartALC, [x, y]. predPartALC, [x, y] is calculated according to equation 4 as:

$$\text{predPartALC}_i[x,y] = \text{Min}(255, (\text{predPart}_i[x,y] * W_i + 2^{\log WDC-1}) \gg \log WDC) \quad (4)$$

predPart$_i$ in equation 4 is calculated according to equation 5:

```
if( logWDC >= 1 )
    predPart_i [ x, y ] =
    Clip1( ( ( predPartL0_i[ x, y ] * w_{0l} + 2^{logWDc -1} )
    >> logWDC ) + o_{0l} )
else
    predPart_i [ x, y ] = Clip1( predPartL0_i[ x, y ] * w0_c + o0_c )   (5)
```

The techniques of this disclosure modify the language of the 3D-AVC WD 4, referenced above. More particularly, the techniques of this disclosure include modifications to a previous proposal submission regarding adaptive luminance compensation that can be found in the document by Mishurovskiy et al.: "JCT3V-B0031", ISO/IEC/JCT1/SC 29/WG 11, Shanghai, China, dated October 2012 ("JCT3V-B0031"). The changes to JCT3V-B0031 are reflected in the 3D-AVC WD 5. The changes detailing some techniques of this disclosure relative to the JCT3V-B0031 will now be described along with some explanation. Additions to the working draft are denoted with lines beginning in "@." Deletions from the JCT3V-B0031 proposal are denoted in lines beginning with "#." Text in bold indicates a section heading in 3D-AVC WD 4.

J.8.3.5.1 Defining of Coordinates and Sizes of a Luma Block to be Predicted

@ Let (xM, yM) be equal to the output of the subclause 6.4.1 (the location of upper-left luma sample for the current macroblock with address mbAddr relative to the upper-left sample of the picture).

@ Let (xP, yP) be equal to the output of the subclause 6.4.2.1 (the location of upper-left luma sample for the macroblock partition mbPartIdx).

Let (xB, yB) be equal to the output of the subclause 6.4.3 (the location of upper-left luma sample for the 4×4 luma block defined by Luma4×4BlkIdx that can be 0 . . . 15).

@ Let (xB, yB) be equal to the output of the subclause 6.4.2.2 (the location of upper-left luma sample for the 4×4 luma block relative to the top-left sample of the sub-macroblock).

Let (xB8, yB8) be equal to the output of the process 6.4.5 (the location of the upper-left luma sample for the 8×8 luma block where Luma8×8BlkIdx=(Luma4×BlkIdx>>2) is given as an input).

The variables xCT, yCT, CBX, CBY are set acooding to table J-8-X: [Ed.(MH): CBX and CBY are not proper variable names as they have no camelCasing.]

TABLE J-8-X

Specification of parameters for deriving LRec, URec, LRef, URef blocks' sample values

| | transform_size_8×8_flag equal to 1 | | | | transform_size_8×8_flag equal to 0 | | | |
|---|---|---|---|---|---|---|---|---|
| #mb_type | xCT | yCT | BX | BY | xCT | yCT | BX | BY |
| #P_L0_16×16 | xCT = xM | yCT = yM | 6 | 6 | xCT = xM + xB8 | yCT = yM + yB8 | | |
| #P_L0_L0_16×8 | xCT = xM + xP | yCT = yM + yP | 6 | | xCT = xM + xB | yCT = yM + yB | | |
| #P_L0_L0_8×16 | xCT = xM + xP | yCT = yM + yP | | 6 | xCT = xM + xB | yCT = yM + yB | | |
| #P_8×8, #P_8×8ref0 | xCT = xM + xP | yCT = yM + yP | | | xCT = xM + xB | yCT = yM + yB | | |
| #P_Skip | | Undefined | | | xCT = xM | yCT = yM | 6 | 6 |

@ The vairables xCT, yCT, CBX, CBY are set as follows:
@ If the mb_type is equal to P_8×8 or P_8×8ref( ) and sub_my_type is not P_L0_8×8,
   @ xCT is set equal to xM+xP+xB
   @ yCT is set equal to yM+yP+yB
   @ CBX and CBY are set equal to 4.
@ Otherwise (the mb_type is equal to P_L0_16×16,
   P_L0—L0_16×8, or
   @ P_L0_L0_8×16, or P_8×8 and P_8×8ref( ) whose sub_my_type are P_L0_8×8)
   @ xCT is set equal to xM+xP
   @ yCT is set equal to yM+yP
   @ CBX is set equal to MbPartWidth(mb_type)
   @ CBY is set equal to MbPartHeight(mb_type).
   @ If one or more of the following conditions are true, W0C is set to 1 and log WDC is set to 15.
   @—xCT is smaller than (xL+1) for xL=3;

@—yCT is smaller than (yL+1) for yL=3;
@—(mvL0[0]+((xCT−xL−1)<<2)) is smaller than 0, for xL=3;
@—(mvL0[1]+((yCT−yL−1)<<2)) is smaller than 0 for yL=3;
@—(mvL0[0]+((xCT+CBX)<<2)) is larger or equal to (PicWidthInSamplesL<<2);
@—(mvL0[1]+((yCT+CBY)<<2)) is larger or equal to (PicHeightInSamplesL<<2).
@ Otherwise LRef, URef, LRec, URec sample values are derived as it is specified in J.8.3.6.2 and J.8.3.6.3 followed by calculation of variables NeighborRefSum, NeighborSum and W0L, O0L specified in the subclause J.8.3.6.4 and J.8.3.6.5 correspondingly.
J.8.3.7 Inter Prediction Process with Adaptive Luminance Compensation for 4×4 Transform
@J.8.3.7 Inter Prediction Process with Adaptive Luminance Compensation for P_8×8 mb_Type
@ This subclause is invoked for a macroblock in a texture view component only when
transform_size_8×8_flag is equal to 0 and
@mb_alc_flag is equal to 1, mb_type is equal to P_8×8, and the both SubMbPartWidth and SubMbPartHeight are less than 8.
The Inter prediction process for a macroblock consists of the following steps in order.

values, denoted as for each macroblock (sub-) partition to determine neighboring inter-view luma samples for adaptive luminance compensation. If a macroblock is partitioned, e.g., into sub-partitions, the computational complexity of performing motion compensation and calculating $W_i$ for each 4×4 block may be high.

In accordance with one example of the techniques of this disclosure, video encoder 20 or video decoder 30 may determine a set of prediction weights only once per partition of a macroblock of video data, or even once per macroblock (e.g., for a particular partition of the macroblock, and reused for each additional partition of the macroblock). More particularly, the above changes to the 3D-AVC WD4 modify the process of determining the location of the blocks of luma samples from the reference picture.

Again, relating to the WD 4 changes above, if the current macroblock is an 8×8 macroblock partition that does not have a sub-macroblock type of size 8×8, the x-coordinate indicating the position of the left- and top-neighboring luma sample blocks (xCT) is equal to the upper-left x-coordinate of the upper-left luma sample for the current macroblock plus the x-coordinate of the upper-left luma sample of the current macroblock partition (xP), plus the x-coordinate of the upper-left luma sample of the macroblock sub-partition (xB). The y-coordinate indicative of the position of the top- and left-neighboring luma sample blocks (yCT) is equal to

---

1. @ Subclause J.8.3.5 is invoked to derive motion vector components, reference indices and prediction weights as follows.
2. # The variable MvCnt is incremented by subMvCnt.
3. @For each
   #macroblock partition mbPartIdx and a
   @ sub-macroblock partition subMbPartIdx the following assignments are made.
   [Ed.(MH): Variable name conventions are not obeyed below, rewriting needed.]
      #- sub_mb_type_Normal[ mbPartIdx ] = sub_mb_type[ mbPartIdx ];
      #- mb_type_Normal = mb_type;
      #- If mb_type is equal to P_L0_16×16, the following apply in order.
         #-  mb_type is set to be equal to P_8×8;
         #-  For mbPartIdx from 0 to NumMbPart( mb_type ) − 1, inclusive,
      #sub_mb_type[ mbPartIdx ] is set to be equal to P_L0_8×8.
      #- Otherwise, the following apply apply in order.
         #-  mb_type is set to be equal to P_8×8;
         #-  For mbPartIdx from 0 to NumMbPart( mb_type ) − 1, inclusive,
      and sub_mb_type[ mbPartIdx ] is set to be equal to P_L0_4×4.
      @  For i from 0 to NumSubMbPart −1, sub_mb_type[ i ] is stored to sub_mb_type_temp [ i ] and is set equal to P_L0_4×4.
4. @ The decoding process for Inter prediction samples for each
   # macroblock partition mbPartIdx and a
   @ sub-macroblock partition subMbPartIdx consists of the following in ordered.
      @- Invoke the subclause J.8.3.6 to derive the prediction weights in adaptive luminance compensation.
         @-    Invoke subclause 8.4.2 to derive the inter prediction samples.
         @-    Invoke subclause 8.5 to derive the transform coefficients and construct the picture prior to deblocking filter process.
5. @ For each
   # macroblock partition mbPartIdx and a
   @ sub-macroblock partition subMbPartIdx the following assignments are made.
      #- mb_type = mb_type_Normal
      #- sub_mb_type[ mbPartIdx ] = sub_mb_type_Normal[ mbPartIdx ]
      @sub_mb_type[ i ] is restored to sub_mb_type_temp [ i ].

---

These revisions to Annex J, sections sub-clauses J.8.3.5.1-J.8.3.7 of 3D-AVC WD4 modify the adaptive luminance compensation techniques described therein. The adaptive luminance compensation techniques may be performed by a video coder, such as video encoder 20, or video decoder 30. The modifications may result in reduced computational complexity relative to the techniques described in the JCT3V-B0031 proposal.

As described briefly above, the techniques of the JCT3V-B0031 proposal may cause a compliant video coder to perform motion compensation to determine ALC weight the y-coordinate of the upper-left luma sample of the current macroblock (yM), plus the y-coordinate of the upper-left luma sample for the current macroblock partition (yP), plus the y-coordinate of the upper-left luma sample for the 4×4 luma block relative to the top-left sample of the sub-macroblock (yB). In this case, the height and width of the luma sample blocks is equal to 4×4 luma samples.

Otherwise, when the transform_size_8×8_flag is equal to 1, xCT is equal to xM+xP, yCT is equal to yM+yP, and the heights of the left-neighboring luma sample blocks (LTRef$_i$, and LTDec$_i$) are equal to the height of the current macroblock partition. The widths of the top-neighboring luma sample blocks (UTRef and UTDec) are equal to the width of the current macroblock partition. Thus, the same set of prediction weights is determined for each macroblock partition, rather than individually for each sub-macroblock partition regardless of the transform size of the macroblock.

In some other examples of the techniques of this disclosure, even for 8×8 macroblock partitions, video encoder 20 or video decoder 30 may determine one set of prediction weights, $W_i$, regardless of whether the motion vectors for each of the 4×4 luma blocks of the macroblock partition are the same or not. In this example, video encoder 20 or video decoder 30 derives the prediction weights, $W_i$ based on ALC weights determined for one 4×4 block of luma samples of the macroblock partition. In some examples, video encoder 20 or video decoder 30 may utilize the techniques of this example when the current block has a transform size larger than 4×4 luma samples. The 4×4 block that the video coder uses to derive prediction weights can be any 4×4 luma block within the 8×8 MB partition in some cases.

In some other examples, when performing ALC, video coder 20 or video decoder 30 may determine the 4×4 block of luma samples that has the maximum value motion vector absolute value (i.e., the sum of the absolute value of the horizontal component and the absolute value of the vertical component of the motion vector).

In still other examples, video encoder 20 or video decoder 30 may derive and use one set of prediction weights for the whole current macroblock. Video encoder 20 or video decoder 30 may determine the ALC weights for the current macroblock using the set of prediction weights derived for the macroblock partition which contains the top-left luma sample of the macroblock. If the MB partition contains multiple luma blocks having different motion vectors, video encoder 20 or video decoder 30 may determine the prediction weights, $W_i$ for the macroblock based on the weights derived for the top-left block of the macroblock partition.

In some examples in accordance with the techniques of this disclosure, video encoder 20 or video decoder 30 may use different sizes of $LTRef_i$, $LTDec_i$, $UTDec_i$ and $UTRef_j$. For example, when illumination compensation is allowed for a given block that has a size of N×M, (where N is the width and M is the height and can be one of 4, 8 or 16), instead of using N×4 top rows and 4×M left columns, video encoder 20 or video decoder 30 may use fewer rows or fewer columns for the derivation of the prediction weights for ALC.

In another example, if N (or M) is equal to 16, video encoder 20 or video decoder 30 may select the top rows (or left columns) of $UTRef_i$, $UTDec_i$, $LTRef_i$, and $LTDec_i$ such that the luma sample blocks chosen have a size of 8×4 (or 4×8). In some other examples in accordance with the techniques of this disclosure, video encoder 20 or video decoder 30 may also be configured not to invoke motion compensation, but rather to take an existing motion vector, round the vector, and use the rounded motion vector to determine the locations of the luma blocks of the reference picture (i.e., $UTRef_i$ and $LTRef_i$).

For example, when deriving the top and left region samples in the reference picture (which is an inter-view reference picture), instead of invoking motion compensation to obtain the luma samples based on the same motion vector as the current block, video encoder 20 or video decoder 30 may round a motion vector. For example, video encoder 20 or video decoder 30 may take an existing motion vector (e.g., mv[0], mv[1]), and round the motion vector to an integer-pel. To round the motion vector to an integer-pel, video encoder 20 or video decoder 30 may use one of equations 6-8, below (when the motion vector is already an integer-pel motion vector, interpolation is not needed):

$$mv[0]=(mv[0]>>2)<<2) \text{ and } mv[1]=(mv[1]>>2)<<2), \text{ or} \quad (6)$$

$$mv[0]=((mv[0]+2)>>2<<2), \text{ and } mv[1]= ((mv[1]+2)>>2<<2) \text{ or}$$

$$mv[0]=((mv[0]+\text{sign}(mv[0])*2)>>2)<<2, \text{ and} \quad (7)$$

$$mv[1]=((mv[1]+\text{sign}(mv[1])*2)>>2)<<2. \quad (8)$$

Alternatively, video encoder 20 or video decoder 30 may round the motion vector to half-pel, e.g., using equation 9, below:

$$mv[0]=(mv[0]>>1)<<1) \text{ and } mv[1]=(mv[1]>>1)<<1). \quad (9)$$

Video encoder 20 or video decoder 30 may also convert the motion vector to derive the top and left luma sample blocks from (a different) motion vector used to motion compensate the current block.

In another example, instead of doing performing motion compensation for a top- or left-neighboring luma block having a size equal to 4×4 or larger than 4×4, video encoder 20 or video decoder 30 may consider only luma samples in one top row and one left column when deriving the prediction weights, $W_i$. In another example, video encoder 20 or video decoder 30 may utilize only the top row and left column, but may derive the location of the reference blocks of luma samples using a motion vector that has been rounded to an integer-pel.

In some other examples, video encoder 20 or video decoder 30 may select only a subset of luma samples from a block of neighboring luma samples when deriving prediction weights. For example, video encoder 20 or video decoder 30 may use both ends of a row or column to derive the prediction weights. In another example, video encoder 20 or video decoder 30 may use luma samples at both ends of the block of luma sample, as well as the middle sample(s) of the row or column when determining the weights for ALC.

In yet another example, video encoder 20 or video decoder 30 may utilize up to four luma samples from a row or column when determine prediction weights for ALC. In this example if a row/column of neighboring luma samples (relative to the current block) has a length of N samples (wherein $N=4*2^s$, S=0, 1, or 2), the horizontal/vertical position x[i] of the chosen samples, relative to the horizontal or vertical coordinate of the top-left sample of the block, may be calculated as: x[i]=i<<s, wherein i in in the range from 0 to 3, inclusive.

In yet another alternative, video encoder 20 or video decoder 30 may down sample luma samples for a row or column. video encoder 20 or video decoder 30 may also filter and down-sample luma of a row or column when determining weights for ALC.

Alternatively, when illumination compensation is allowed for a given block that has a size of N×M, wherein N is the width and M is the height and at least one of them is equal to 16, instead of using N×4 top rows and 4×M left columns, video encoder 20 or video decoder 30 may use fewer rows or fewer columns for performing the derivation of the prediction weights for ALC.

In still other examples, video encoder 20 or video decoder 30 may select samples inside the neighboring 16×4 top-neighboring luma sample region (or left 4×16 luma sample region) such that the luma samples form an 8×4 (or 4×8) or 4×4. Video coder 20 or video decoder 30 may also use filtered samples from the 16×4 top region (or left 4×16 region) that can form an 8×4 (or 4×8) or 4×4 region. It should also be understood that any of the techniques of this disclosure can be performed regardless of the dimensions, N or M, of the macroblock.

In various examples, video encoder 20 or video decoder 30 may select the dimensions of the left-neighboring and top-neighboring sample regions regardless of the transform size of the current macroblock. Video encoder 20 or video decoder 30 may also select the dimensions of the left- and top-neighboring sample regions regardless of the transform size of the current block, but based on the size of the current macroblock partition or sub-partition.

Video encoder 20 or video decoder 30 may also MB partition independent reference samples identification: in this method, a MB is always filtered by a set of weights generated regardless the MB partition.

In various examples, alternative, video encoder 20 or video decoder 30 may set the top- and left-luma reference samples for ALC to the top 4×4 and left 4×4 luma blocks of the top-left 4×4 block of the current macroblock. Additionally, video encoder 20 or video decoder 30 may set the motion vector of that block that is used to get the predictor of the reference samples in a reference view.

In some examples, video encoder 20 or video decoder 30 may set the top and left reference samples to the top 4×4 and left 4×4 luma blocks of the top-left 4×4 block of the current macroblock. Video encoder 20 or video decoder 30 may also determine the motion vector used to determine the predictor block of luma reference samples in the reference view by using one or more motion vectors of the blocks of the current macroblock.

In some other techniques of this disclosure, video encoder 20 or video decoder 30 may be configured to perform macroblock partition-dependent, but sub-block partition independent, reference samples identification. In these techniques, video encoder 20 or video decoder 30 may derive one set of ALC weights for each macroblock partition. Video encoder 20 or video decoder 30 may be configured to jointly filter pixels within a macroblock partition using the one set of weights regardless the sub-block partition. For example, for an 8×8 MB partition, if the 8×8 partition is further partitioned into four 4×4 blocks, video encoder 20 or video decoder 30 may use the same set of filter coefficients for the four blocks, and may filter the blocks jointly.

In another example, video encoder 20 or video decoder 30 may set the top and left reference samples to the top 4×4 and left 4×4 block of the top left 4×4 block of a macroblock partition. In this example, video encoder 20 or video decoder 30 uses the motion vector of the top-4×4 and left 4×4 block to determine the location of the predictive block of luma samples from the reference view.

In another alternative, if a macroblock partition has a size of M×N, and M or N is larger than 8, or M or N has a size equal to 8, but the macroblock partition has a sub-block partition that is 8×8, video encoder 20 or video decoder 30 may select the left luma reference sample region such that the region has a size of 4×N and a region of top reference samples such that the top reference sample region has a size of M×4. Video encoder 20 or video decoder 30 may also select the left reference samples region such that the left luma reference sample region has a size of 4×8 and the right reference sample region such that the right luma reference sample region has a size of 8×4. Video encoder 20 or video decoder 30 such that the left and top luma reference sample regions have a size of 4×N/2 and M/2×4, respectively.

In various examples, video encoder 20 or video decoder 30 may perform macroblock partition-dependent and sub-block partition dependent reference samples identification. In this example, video encoder 20 or video decoder 30 derive one set of ALC prediction weights for each MB partition. However, video encoder 20 or video decoder 30 may utilize different techniques to identify the reference samples for each sub-block partition. If the macroblock partition is an 8×8 partition, and the sub-block partition has a size of either: two 8×4 (m×n) blocks or two 4×8 (m×n) blocks, video encoder 20 or video decoder 30 may select the left reference samples region such that the left-neighboring reference samples region has a size of 4×n and the top reference luma samples a size of m×4.

In one alternative, if the macroblock partition is of size 8×8 and the sub-block partition is either two 8×4 (m×n) blocks or two 4×8 (m×n) blocks, video encoder 20 or video decoder 30 may determine the motion vector indicative of the location of the predictive block of luma samples for the current block based on one of the motion vectors indicative of the locations of the top- or left-neighboring blocks of reference luma samples. In another alternative, video encoder 20 or video decoder 30 may utilize the motion vectors that indicate the location of the top- and/or left-neighboring reference sample blocks when determining motion vector indicative of the predictive block of luma samples for the current block.

The techniques described herein for modifications to the 3D-AVC working draft include techniques that cause a coder configured in accordance with the techniques of this disclosure to perform motion compensation to determine weights for ALC only once per macroblock partition. The video coder then uses the same motion vector to determine the reference luma samples for each macroblock partition and any sub-partitions within the macroblock partition.

Thus, in one example, video encoder 20 and video decoder 30 may be configured to prediction weights for illumination compensation of luma samples of a video block partition once for the video block partition such that the video block partition has a common set of prediction weights for performing illumination compensation of the luma samples of a transform size for the video block partition, calculate a predicted block for the video block partition using the prediction weights using illumination compensation, and code (e.g., encode or decode) the video block partition using the predicted block.

Figure 2:
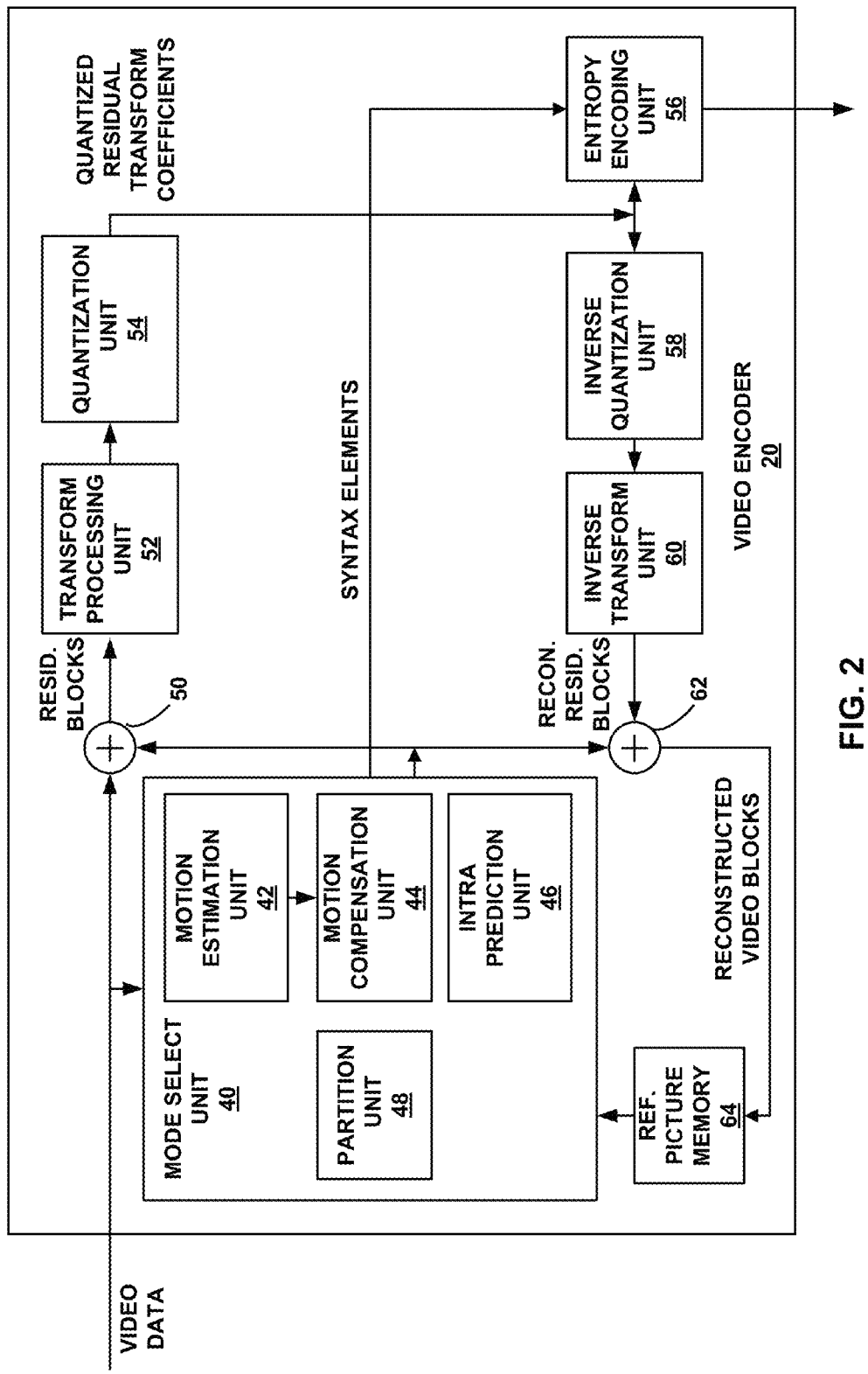
FIG. 2 is a block diagram illustrating an example video encoder 20 that may be configured to perform adaptive luminance compensation in accordance with the techniques of this disclosure

FIG. 2 is a block diagram illustrating an example video encoder 20 that may be configured to perform adaptive luminance compensation in accordance with the techniques of this disclosure. Video encoder 20 receives video data to be encoded. In the example of FIG. 2, video encoder 20 includes a mode select unit 40, summer 50, transform processing unit 52, quantization unit 54, entropy encoding unit 56, and reference picture memory 64. Mode select unit 40, in turn, includes motion estimation unit 42, motion compensation unit 44, intra prediction unit 46, and partition unit 48.

For video block reconstruction, video encoder 20 also includes inverse quantization unit 58, inverse transform processing unit 60, and summer 62. A deblocking filter (not shown in FIG. 2) may also be included to filter block boundaries to remove blockiness artifacts from reconstructed video. If desired, the deblocking filter would typically filter the output of summer 62. Additional loop filters (in loop or post loop) may also be used in addition to the deblocking filter. Such filters are not shown for brevity, but if desired, may filter the output of summer 50 (as an in-loop filter).

Mode select unit 40 may receive raw video data in the form of blocks from one or more views. In 3D-AVC, the views may correspond to a left eye view and a right eye view. Mode select unit 40 may select one of the coding modes, intra or inter (e.g., intra-view inter-prediction, also referred to as temporal prediction, or inter-view prediction), e.g., based on error results, and provides the resulting intra- or inter-predicted block to summer 50 to generate residual block data and to summer 62 to reconstruct the encoded block for use as a reference picture. In some examples, mode select unit 40 may determine that a block should be inter-view predicted based on video data from a different view. Mode select unit 40 also provides syntax elements, such as motion vectors, intra-mode indicators, partition information, and other such syntax information, to entropy encoding unit 56.

Motion estimation unit 42 and motion compensation unit 44 may be highly integrated, but are illustrated separately for conceptual purposes. Motion estimation, performed by motion estimation unit 42, is the process of generating motion vectors, which estimate motion for video blocks. Similarly, motion estimation unit 42 may perform disparity estimation for inter-view prediction, resulting in a disparity motion vector. A motion vector, for example, may indicate the displacement of a block of a video block within a current picture relative to a predictive block within a reference picture (or other coded unit) relative to the current block being coded within the current picture (or other coded unit).

In various examples in accordance with the techniques of this disclosure, motion estimation unit 42 may determine a motion vector that indicates the displacement of the current block relative to a predictive block from a different view, e.g., when the current block is inter-view predicted. Motion estimation unit 42 may also be configured to determine motion vectors that indicate the location(s) of one or more blocks or regions of reference luma samples that video encoder 20 uses to determine weights when performing ALC. Motion estimation unit 42 may calculate motion vectors (e.g., temporal and/or disparity motion vectors) having fractional picture accuracy, e.g., one-half or one-quarter pixel accuracy. In accordance with certain techniques of this disclosure, motion compensation unit 44 may be configured to perform rounding of motion vectors when performing ALC, e.g., rounding of a fractional-pel motion vector to an integer-pel or half-pel precision motion vector.

A predictive block is a block that is found to closely match the block to be coded, in terms of pixel difference, which may be determined by sum of absolute difference (SAD), sum of square difference (SSD), or other difference metrics. In some examples, video encoder 20 may calculate values for sub-integer pixel positions of reference pictures stored in reference picture memory 64. For example, video encoder 20 may interpolate values of one-quarter pixel positions, one-eighth pixel positions, or other fractional pixel positions of the reference picture. Therefore, motion estimation unit 42 may perform a motion search relative to the full pixel positions and fractional pixel positions and output a motion vector with fractional pixel precision.

Motion estimation unit 42 calculates a motion vectors for a PU of a video block in an inter-coded slice by comparing the position of the PU to the position of a predictive block of a reference picture. Motion estimation/disparity unit 42 may also be configured to perform inter-view prediction, in which case motion estimation/disparity unit 42 may calculate displacement vectors between blocks of one view picture (e.g., view 0) and corresponding blocks of a reference view picture (e.g., view 1). In general, data for a motion vector may include a reference picture list, an index into the reference picture list (ref_idx), a horizontal component, and a vertical component. The reference picture may be selected from a first reference picture list (List 0) or a second reference picture list (List 1), each of which identify one or more reference pictures stored in reference picture memory 64. For each list (i.e., List 0 or List 1), video encoder 20 may select the entries based on ascending order of the reference index.

Motion estimation unit 42 may generate and send a motion vector that identifies the predictive block of the reference picture to entropy encoding unit 56 and motion compensation unit 44. That is, motion estimation unit 42 may generate and send motion vector data that identifies the reference picture list containing the predictive block, an index into the reference picture list identifying the picture of the predictive block, and a horizontal and vertical component to locate the predictive block within the identified picture.

Motion compensation, performed by motion compensation unit 44, may involve fetching or generating the predictive block based on the motion vector determined by motion estimation unit 42. Again, motion estimation unit 42 and motion compensation unit 44 may be functionally integrated, in some examples. Upon receiving the motion vector for a partition of the current video macroblock, motion compensation unit 44 may locate the predictive block to which the motion vector points in one of the reference picture lists.

Motion compensation unit 44 may also perform certain techniques related to ALC in accordance with the techniques of this disclosure. In some examples, motion compensation unit 44 may be configured to determine top- and left-neighboring luma sample blocks relative to the current block. The top- and left-neighboring sample blocks may comprise luma sample regions from previously coded blocks of the same frame as the current block (e.g., UTDec, and LTDec regions described above), as well as luma sample regions that neighbor the reference block (e.g., LTRef, and UTDec, described above).

Motion compensation unit 44 may determine the location of the sample regions, as well as the location of the predictive luma sample values for the current block based on one or more motion vectors generated by motion estimation unit 42. If the current block has ALC enabled, once motion compensation unit 44 determines the top- and left-neighboring luma sample regions for the current block, motion compensation unit 44 compares the absolute values of the corresponding samples from the blocks to generate the Ref_Ref, and Ref_Dec variables, and the weight factor for the current block, $W_i$, as described above. Once motion compensation unit 44 determines the weight factor, W, for the current macroblock partition or sub-partition, motion compensation unit 44 may adjust the predictive block of luma values for the current block, predPart, by the weight factor $W_i$ in accordance with equation 4, described above.

In accordance with the techniques of this disclosure, motion compensation unit 44 may be configured to deriving prediction weights for illumination compensation of luma samples of a video block partition once for the video block partition such that the video block partition has a common set of prediction weights for performing illumination compensation of the luma samples, regardless of a transform size for the video block partition. Motion compensation unit 44 may be configured to perform illumination compensation of the luma samples further in accordance with the techniques of this disclosure. For instance, when a current macroblock is uni-directionally predicted from an inter-view reference picture in a P-slice, motion compensation unit 44 may perform illumination compensation for luma samples of the current macroblock, in accordance with the techniques of this disclosure. Likewise, motion compensation unit 44 may apply the prediction weights to a reference block for a partition of a current macroblock to calculate a predictive block for the partition.

Summer 50 forms a residual video block by subtracting pixel values of the predictive block from the pixel values of the current video block being coded, forming pixel difference values, as discussed below. In general, motion estimation unit 42 performs motion estimation relative to luma components, and motion compensation unit 44 uses motion vectors calculated based on the luma components for both chroma components and luma components. Mode select unit 40 may also generate syntax elements associated with the video blocks and the video slice for use by video decoder 30 in decoding the video blocks of the video slice.

Intra-prediction unit 46 may intra-predict a current block, as an alternative to the inter-prediction performed by motion estimation unit 42 and motion compensation unit 44, as described above. In particular, intra-prediction unit 46 may determine an intra-prediction mode to use to encode a current block. In some examples, intra-prediction unit 46 may encode a current block using various intra-prediction modes, e.g., during separate encoding passes, and intra-prediction unit 46 (or mode select unit 40, in some examples) may select an appropriate intra-prediction mode to use from the tested modes.

For example, intra-prediction unit 46 may calculate rate-distortion values using a rate-distortion analysis for the various tested intra-prediction modes, and select the intra-prediction mode having the best rate-distortion characteristics among the tested modes. Rate-distortion analysis generally determines an amount of distortion (or error) between an encoded block and an original, unencoded block that was encoded to produce the encoded block, as well as a bitrate (that is, a number of bits) used to produce the encoded block. Intra-prediction unit 46 may calculate ratios from the distortions and rates for the various encoded blocks to determine which intra-prediction mode exhibits the best rate-distortion value for the block.

After selecting an intra-prediction mode for a block, intra-prediction unit 46 may provide information indicative of the selected intra-prediction mode for the block to entropy encoding unit 56. Entropy encoding unit 56 may encode the information indicating the selected intra-prediction mode. Video encoder 20 may include in the transmitted bitstream configuration data, which may include a plurality of intra-prediction mode index tables and a plurality of modified intra-prediction mode index tables (also referred to as codeword mapping tables), definitions of encoding contexts for various blocks, and indications of a most probable intra-prediction mode, an intra-prediction mode index table, and a modified intra-prediction mode index table to use for each of the contexts.

Video encoder 20 forms a residual video block by subtracting the prediction data from mode select unit 40 from the original video block being coded. Summer 50 represents the component or components that perform this subtraction operation. Transform processing unit 52 applies a transform, such as a discrete cosine transform (DCT) or a conceptually similar transform, to the residual block, producing a video block comprising residual transform coefficient values. Transform processing unit 52 may perform other transforms which are conceptually similar to DCT. Wavelet transforms, integer transforms, sub-band transforms or other types of transforms could also be used. In any case, transform processing unit 52 applies the transform to the residual block, producing a block of residual transform coefficients. The transform may convert the residual information from a pixel value domain to a transform domain, such as a frequency domain.

Transform processing unit 52 may send the resulting transform coefficients to quantization unit 54. Quantization unit 54 quantizes the transform coefficients to further reduce bit rate. The quantization process may reduce the bit depth associated with some or all of the coefficients. The degree of quantization may be modified by adjusting a quantization parameter. In some examples, quantization unit 54 may then perform a scan of the matrix including the quantized transform coefficients. Alternatively, entropy encoding unit 56 may perform the scan.

Following quantization, entropy encoding unit 56 entropy codes the quantized transform coefficients. For example, entropy encoding unit 56 may perform context adaptive variable length coding (CAVLC), context adaptive binary arithmetic coding (CABAC), syntax-based context-adaptive binary arithmetic coding (SBAC), probability interval partitioning entropy (PIPE) coding or another entropy coding technique. In the case of context-based entropy coding, context may be based on neighboring blocks. Following the entropy coding by entropy encoding unit 56, the encoded bitstream may be transmitted to another device (e.g., video decoder 30) or archived for later transmission or retrieval.

Inverse quantization unit 58 and inverse transform unit 60 apply inverse quantization and inverse transformation, respectively, to reconstruct the residual block in the pixel domain, e.g., for later use as a reference block. Motion compensation unit 44 may calculate a reference block by adding the residual block to a predictive block of one of the pictures of reference picture memory 64. Motion compensation unit 44 may also apply one or more interpolation filters to the reconstructed residual block to calculate sub-integer pixel values for use in motion estimation. Summer 62 adds the reconstructed residual block to the motion compensated prediction block produced by motion compensation unit 44 to produce a reconstructed video block for storage in reference picture memory 64. The reconstructed video block may be used by motion estimation unit 42 and motion compensation unit 44 as a reference block to inter-code a block in a subsequent picture.

Video encoder 20 may generate a number of syntax elements, as described above, which may be encoded by entropy encoding unit 56 or another encoding unit of video encoder 20. In some examples, video encoder 20 may generate and encode syntax elements for a 3D-AVC bitstream, as described above, where again this 3DVC bitstream may be backwards compatible with H.264/AVC.

In this manner, video encoder 20 may be configured to derive prediction weights for illumination compensation of luma samples of a video block partition once for the video block partition such that the video block partition has a common set of prediction weights for performing illumination compensation of the luma samples regardless of a transform size for the video block partition, calculate a predicted block for the video block partition using the prediction weights using illumination compensation, and encode the video block partition using the predicted block.

Figure 3:
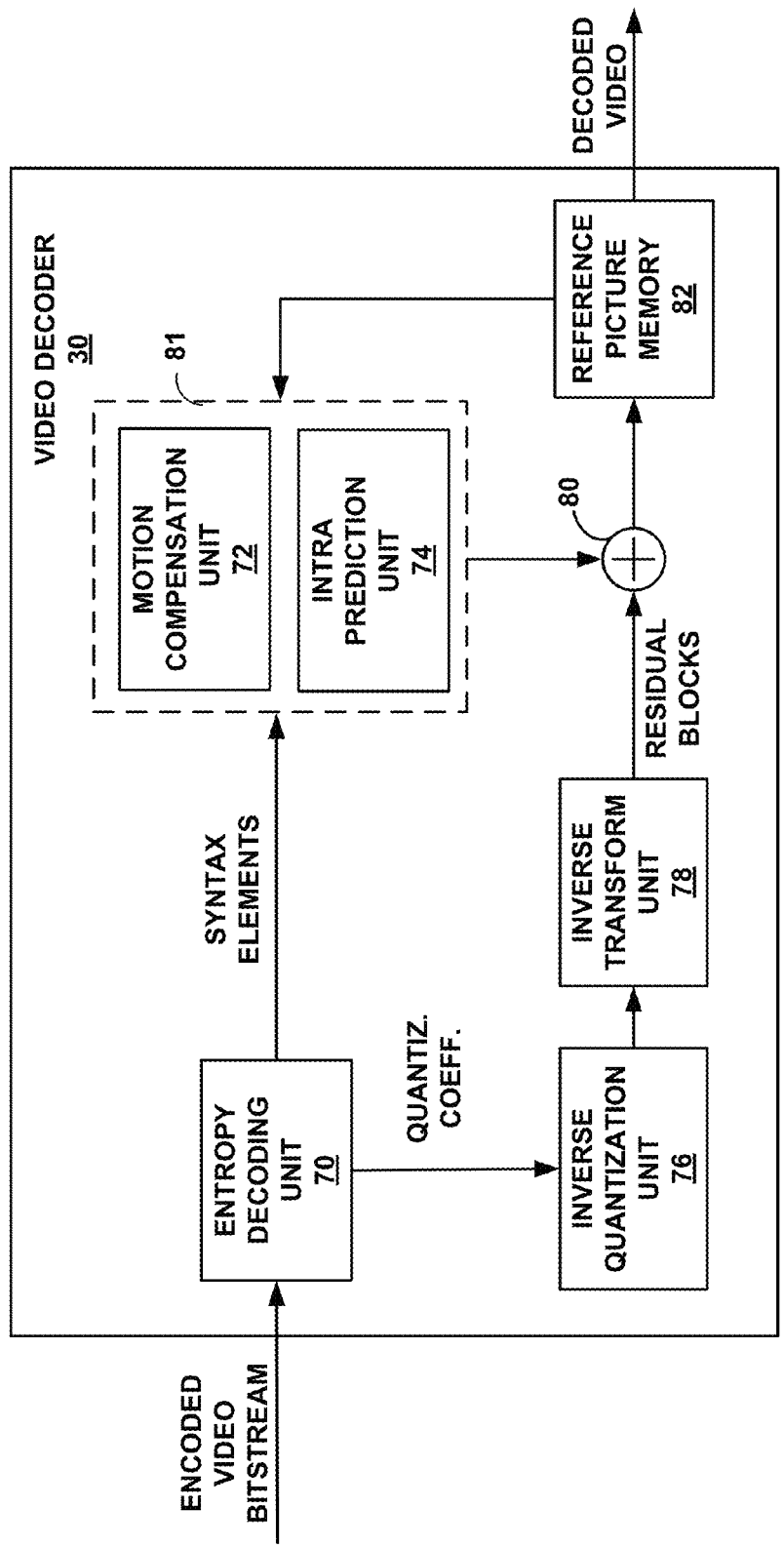
FIG. 3 is a block diagram illustrating an example video decoder 30 that may be configured to perform adaptive luminance compensation in accordance with the techniques of this disclosure.

FIG. 3 is a block diagram illustrating an example video decoder 30 that may be configured to perform adaptive luminance compensation in accordance with the techniques of this disclosure. In the example of FIG. 3, video decoder 30 includes an entropy decoding unit 70, prediction unit 81 having motion compensation unit 72 and intra prediction unit 74, inverse quantization unit 76, inverse transform unit 78, summer 80, and reference picture memory 82.

During the decoding process, video decoder 30 receives an encoded video bitstream that represents video blocks of an encoded video slice and associated syntax elements from video encoder 20. Entropy decoding unit 70 of video decoder 30 entropy decodes the bitstream to generate quantized coefficients, motion vectors, and other syntax elements. Entropy decoding unit 70 forwards the motion vectors and other prediction-related syntax elements to prediction unit 81. Video decoder 30 may receive the syntax elements at the video slice level and/or the video block level.

For example, video decoder 30 may receive a number of NAL units having a NAL unit header that identifies a type of data stored to the NAL unit (e.g., VCL data and non-VCL data). Parameter sets may contain the sequence-level header information, such as an SPS, PPS, or other parameter set described above.

When a video slice is coded as an intra-coded (I) slice, intra prediction unit 74 of prediction unit 81 may generate prediction data for a video block of the current video slice based on a signaled intra prediction mode and data from previously decoded blocks of the current picture in view of the active parameter sets. When the picture is coded as an inter-coded (i.e., B, P or generalize PB (GPB)) slice, motion compensation unit 72 of prediction unit 81 produces predictive blocks for a video block of the current video slice based on the motion vectors and other syntax elements received from entropy decoding unit 80, again in view of the active parameter sets. The predictive blocks may be produced from one of the reference pictures within one of the reference picture lists. Video decoder 30 may construct the reference picture lists, List 0 and List 1 (or a combined list, List c) using default construction techniques based on reference pictures stored in reference picture memory 82.

Motion compensation unit 72 determines prediction information for a video block of the current video slice by parsing the motion vectors and other syntax elements, and uses the prediction information to produce the predictive blocks for the current video block being decoded. For example, motion compensation unit 72 uses some of the received syntax elements to determine a prediction mode (e.g., intra- or inter-prediction) used to code the video blocks of the video slice, an inter-prediction slice type (e.g., B slice or P slice), construction information for one or more of the reference picture lists for the slice, motion vectors for each inter-encoded video block of the slice, inter-prediction status for each inter-coded video block of the slice, and other information to decode the video blocks in the current video slice.

Entropy decoding unit or motion compensation unit 72 may also determine motion vectors that are utilized when performing ALC on an inter-view predicted block. Motion compensation unit 72 may determine the location of an inter-view predictive block of luma samples used to predict the luma values for the current block (predPart) based on a motion vector decoded using entropy decoding unit 70. Entropy decoding unit 70 and motion compensation unit 72 may also determine one or more motion vectors that indicate the position of top- and left-neighboring luma sample block regions, $LTRef_i$, and $UTRef_i$ from the same reference block as $predPart_i$, the predictive luma block from the reference view.

Motion compensation unit 72 may also determine the top- and left-neighboring luma sample block regions relative to the current block, $LTDec_i$ and $UTDec_i$. $LTDec_i$ and $UTDec_i$ are located in the same frame as the current block. Motion compensation unit 72 may perform ALC on the current block by determining the difference between corresponding samples of $UTRef_i$ and $UTDec_i$ and $LTDec_i$ and $LTRef_i$, as described above in equation to generate the variables $Ref\_Ref_i$ and $Ref\_Dec_i$ for the current macroblock partition or sub-partition. Motion compensation unit 72 may determine the weight factor $W_i$ for performing ALC on the current macroblock partition or sub-partition, etc., in accordance with equation 3, above. Motion compensation unit 72 adjusts the predicted luma values of $predPart_i$ by W, in accordance with equation 4, above. The output of the weight of $predPart_i$ is the weighted predictive block of luma samples, $predPartALC_i$.

In this manner, motion compensation unit 72 may be configured to perform illumination compensation in accordance with the techniques of this disclosure, e.g., to derive prediction weights for illumination compensation of luma samples of a video block partition once for the video block partition such that the video block partition has a common set of prediction weights for performing illumination compensation of the luma samples regardless of a transform size for the video block partition and calculate a predicted block for the video block partition using the prediction weights using illumination compensation.

Inverse quantization unit 76 inverse quantizes, i.e., de-quantizes, the quantized transform coefficients provided in the bitstream and decoded by entropy decoding unit 70. The inverse quantization process may include use of a quantization parameter calculated by video encoder 20 for each video block in the video slice to determine a degree of quantization and, likewise, a degree of inverse quantization that should be applied.

Inverse transform unit 78 applies an inverse transform, e.g., an inverse DCT, an inverse integer transform, or a conceptually similar inverse transform process, to the transform coefficients in order to produce residual blocks in the pixel domain. Inverse transform processing 78 may determine the manner in which transforms were applied to residual data.

After motion compensation unit 72 generates the predictive block for the current video block based on the motion vectors and other syntax elements, video decoder 30 forms a decoded video block by summing the residual blocks from inverse transform unit 78 with the corresponding predictive blocks generated by motion compensation unit 72. Summer 80 represents the component or components that perform this summation operation. If desired, a deblocking filter may also be applied to filter the decoded blocks in order to remove blockiness artifacts. Other loop filters (either in the coding loop or after the coding loop) may also be used to smooth pixel transitions, or otherwise improve the video quality. The decoded video blocks in a given picture are then stored in reference picture memory 82, which stores reference pictures used for subsequent motion compensation. Reference picture memory 82 also stores decoded video for later presentation on a display device, such as display device 32 of FIG. 1.

In this manner, video decoder 30 of FIG. 3 may be configured to derive prediction weights for illumination compensation of luma samples of a video block partition once for the video block partition such that the video block partition has a common set of prediction weights for performing illumination compensation of the luma samples regardless of a transform size for the video block partition, calculate a predicted block for the video block partition using the prediction weights using illumination compensation, and decode the video block partition using the predicted block.

Figure 4:
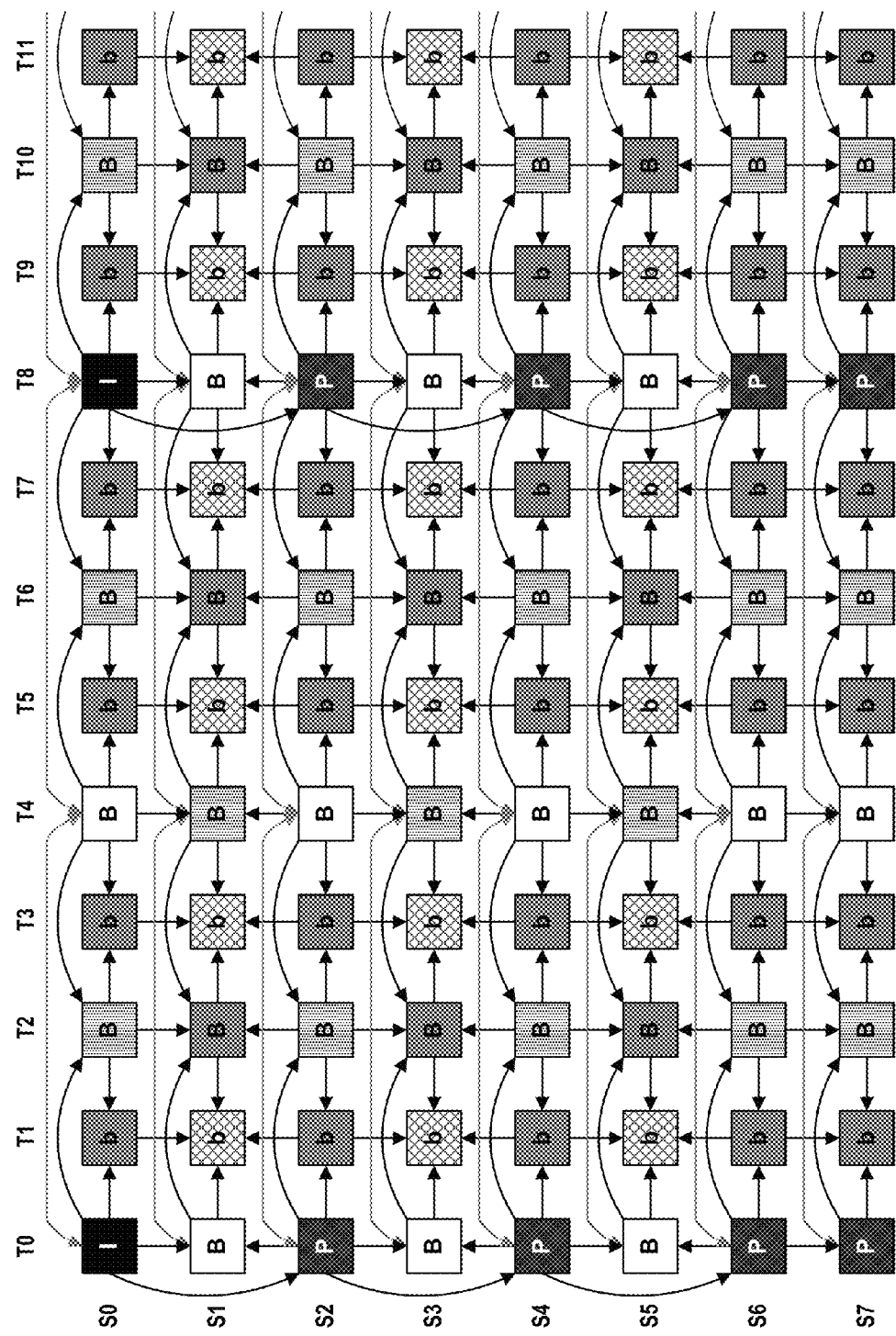
FIG. 4 is a conceptual diagram illustrating an example 3D-AVC prediction pattern.

FIG. 4 is a conceptual diagram illustrating an example 3D-AVC prediction pattern. In the example of FIG. 4, eight views are illustrated, and twelve temporal locations are illustrated for each view. In general, each row in FIG. 4 corresponds to a view, while each column indicates a temporal location. Each of the views may be identified using a view identifier ("view_id"), which may be used to indicate a relative camera location with respect to the other views. In the example shown in FIG. 4, the view IDs are indicated as "S0" through "S7," although numeric view IDs may also be used. In addition, each of the temporal locations may be identified using a picture order count (POC) value, which indicates a display order of the pictures. In the example shown in FIG. 4, the POC values are indicated as "T0" through "T11."

Pictures in FIG. 4 are indicated using a shaded block including a letter, designating whether the corresponding picture is intra-coded (that is, an I-frame), or inter-coded in one direction (that is, as a P-frame) or in multiple directions (that is, as a B-frame). In general, predictions are indicated by arrows, where the pointed-to picture uses the point-from object for prediction reference. For example, the P-frame of view S2 at temporal location T0 is predicted from the I-frame of view S0 at temporal location T0. Each of the pictures shown in FIG. 4 may be referred to as a view component.

As with single view video encoding, pictures of a 3D-AVC video sequence may be predictively encoded with respect to pictures at different temporal locations. For example, the b-frame of view S0 at temporal location T1 has an arrow pointed to it from the I-frame of view S0 at temporal location T0, indicating that the b-frame is predicted from the I-frame. Additionally, however, in the context of multiview video encoding, pictures may be inter-view predicted. That is, a view component can use the view components in other views for reference. In 3D-AVC, for example, inter-view prediction is realized as if the view component in another view is an inter-prediction reference. The potential inter-view references may be signaled in the SPS 3D-AVC extension and may be modified by the reference picture list construction process, which enables flexible ordering of the inter-prediction or inter-view prediction references.

FIG. 4 provides various examples of inter-view prediction. Pictures of view S1, in the example of FIG. 4, are illustrated as being predicted from pictures at different temporal locations of view S1, as well as inter-view predicted from pictures of pictures of views S0 and S2 at the same temporal locations. For example, the b-frame of view S1 at temporal location T1 is predicted from each of the B-frames of view S1 at temporal locations T0 and T2, as well as the b-frames of views S0 and S2 at temporal location T1.

In the example of FIG. 4, capital "B" and lowercase "b" are intended to indicate different hierarchical relationships between pictures, rather than different encoding methodologies. In general, capital "B" frames are relatively higher in the prediction hierarchy than lowercase "b" frames. FIG. 4 also illustrates variations in the prediction hierarchy using different levels of shading, where a greater amount of shading (that is, relatively darker) pictures are higher in the prediction hierarchy than those pictures having less shading (that is, relatively lighter). For example, all I-frames in FIG. 4 are illustrated with full shading, while P-frames have somewhat lighter shading, and B-frames (and lowercase b-frames) have various levels of shading relative to each other, but always lighter than the shading of the P-frames and the I-frames.

In general, the prediction hierarchy is related to view order indexes, in that pictures relatively higher in the prediction hierarchy should be decoded before decoding pictures that are relatively lower in the hierarchy, such that those pictures relatively higher in the hierarchy can be used as reference pictures during decoding of the pictures relatively lower in the hierarchy. A view order index is an index that indicates the decoding order of view components in an access unit. The view order indices may be implied in a parameter set, such as an SPS. In this manner, pictures used as reference pictures may be decoded before decoding the pictures that are encoded with reference to the reference pictures.

In some instances, a subset of a whole bitstream can be extracted to form a sub-bitstream which still conforms to 3D-AVC. There are many possible sub-bitstreams that specific applications may require, based on, for example, a service provided by a server, the capacity, support, and capabilities of decoders of one or more clients, and/or the preference of one or more clients. For example, a client might require only three views, and there might be two scenarios. In one example, one client may require a smooth viewing experience and might prefer views with view_id values S0, S1, and S2, while another other client may require view scalability and prefer views with view_id values S0, S2, and S4. Both of these sub-bitstreams can be decoded as independent MVC bitstreams and can be supported simultaneously.

In accordance with the techniques of this disclosure, video data of a non-base view may be predicted from a base view. Furthermore, a video coder, such as video encoder 20 or video decoder 30, may be configured to perform illumination compensation when coding luma samples of a non-base view. For instance, as shown in FIG. 4, data of view S2 can be inter-view predicted from data of view S0. Thus, for example, a video coder may utilize illumination compensation to code blocks of the P-picture at time T0 of view S2 relative to data of the I-picture of view S0 at time T0. As an example, the video coder may derive prediction weights for a video block partition of a video block (e.g., a macroblock) of the P-picture at time T0 of view S2 once.

Figure 5:
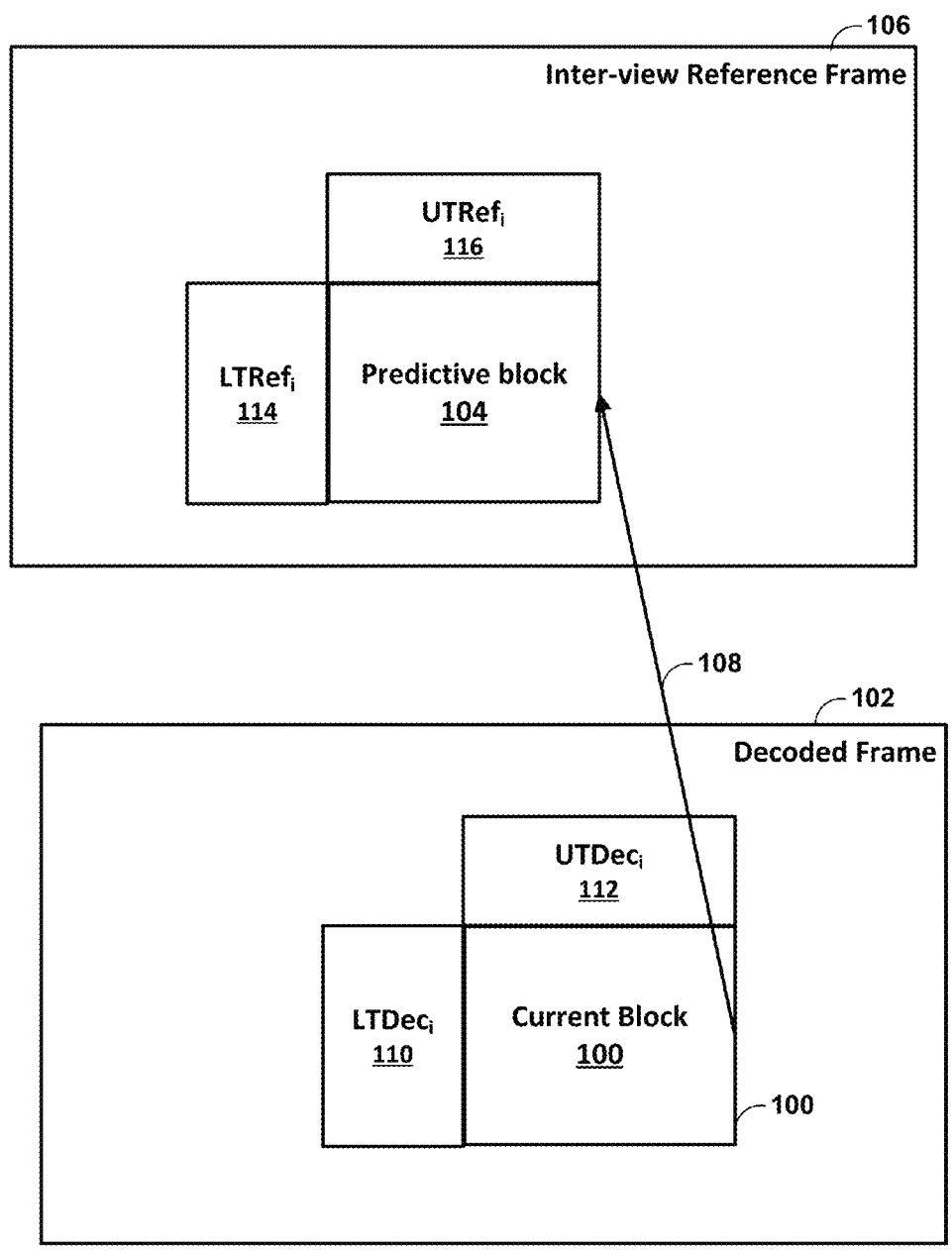
FIG. 5 is a conceptual diagram illustrating the relationship between a block of an inter-view predicted reference frame, and a current block of a decoded frame.

FIG. 5 is a conceptual diagram illustrating the relationship between a block of an inter-view predicted reference frame, and a current block of a decoded frame. In the example of FIG. 5, a current block 100 of decoded frame 102 is related to a predictive block 104, predPart$_i$, of an inter-view reference frame 106 via a motion vector 108. Motion vector 108 indicates the relative displacement of the current block 100 relative to predictive block 104.

To the left, and above current block 100 and predictive block 104 are luma sample blocks. The left-neighboring luma sample block relative to current block is LTDec$_i$ 110, and the top-neighboring luma sample block relative to current block 100 is UTDec$_i$ 112. The left-neighboring block relative to predictive block 104 is LTRef$_i$ 114, and the top-neighboring block relative to predictive block 104 is UTRef$_i$ 116.

The arrangement of UTRef$_i$ 116, LTRef$_i$ 114, UTDec$_i$ 112, and LTDec$_i$ 110 illustrated in FIG. 5 is merely an example. In accordance with the techniques of this disclosure, video encoder 20 or video decoder 30 may determine sizes and/or locations of UTRef$_i$, LTRef$_i$, UTDec$_i$, and LTDec$_i$ other than those illustrated in FIG. 5. For example, UTRef$_i$, LTRef$_i$, UTDec$_i$, and LTDec$_i$ may have dimensions smaller than the width or height of current block 100 and predictive block 104. Although only one motion vector, motion vector 108 is illustrated in FIG. 5, there may be different motion vectors that indicate the positions of one or more of LTRef$_i$ 114 and UTRef$_i$ 116, as examples.

Figure 6A:
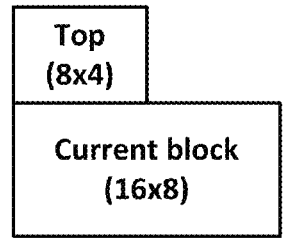
FIGS. 6A-6D are conceptual diagrams illustrating examples of adaptive luminance compensation techniques in accordance with the techniques of this disclosure.

FIGS. 6A-6D are conceptual diagrams illustrating examples of adaptive luminance compensation techniques in accordance with the techniques of this disclosure. As described briefly above with respect to FIG. 1, video encoder 20 or video decoder 30 may be configured to use top- and left-neighboring luma sample region blocks of different sizes and locations. In accordance with the techniques of this disclosure, video encoder 20 or video decoder 30 of FIGS. 1-3 may be configured to either determine luma sample region blocks having a size of 8×4 samples, for the top-neighboring sample region, and 4×8 samples for the left-neighboring region. FIG. 6A illustrates a configuration in which video encoder 20 or video decoder 30 utilizes a 8×4 top-neighboring sample in accordance with the techniques of this disclosure.

Figure 6B:
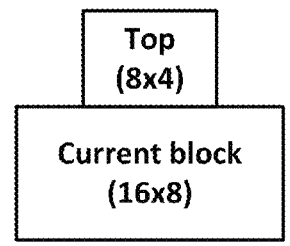

FIG. 6B illustrates another possible 4×8 or 8×4 luma sample region block configuration that video encoder 20 or video decoder 30 may be configured to select when performing ALC. In the example of FIG. 6B, video encoder 20 or video decoder 30 select the middle 8×4 region for the top-neighboring sample, and may select a left-neighboring middle 4×8 luma sample region block (not shown in FIG. 6B).

In some examples, video encoder 20 or video decoder 30 may select any 8×4 top regions inside the original 16×4 top region relative to the current block when N is equal to 16. Video encoder 20 or video decoder 30 may select any 4×8 regions inside the original 4×16 region when M is equal to 16. In cases where the luma sample blocks for ALC weighting are of size 8×4 or 4×8 samples, video encoder 20 or video decoder 30 may determine the location of the 8×4 or 8×4 reference block(s) (i.e., LTRef$_i$ and UTRef$_i$) in various ways, e.g., similar to what is done in the current working draft of 3D-AVC.

Figure 6C:
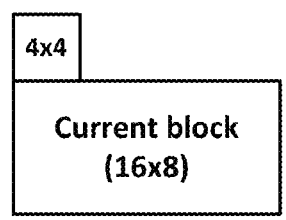

FIG. 6C illustrates yet another possible luma sample region block configuration for video encoder 20 or video decoder 30. In FIG. 6C, if N, the width of the current macroblock partition, or M, the height of the current macroblock partition, is not equal to 4, video encoder 20 or video decoder 30 determines a leftmost 4×4 top-neighboring luma sample region for use when determining weight factors for ALC. Video encoder 20 or video decoder 30 may similarly be configured to determine a middle topmost left-neighboring 4×4 luma sample block region (not illustrated in FIG. 6C).

Figure 6D:
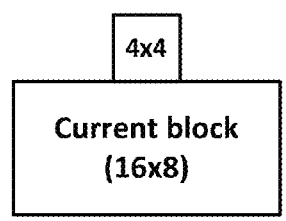

FIG. 6D illustrates another possible luma sample region configuration for video encoder 20 or video decoder 30 when performing ALC. In the example of FIG. 6D, if N or M is not equal to four, video encoder 20 or video decoder 30 is configured to determine a middle 4×4 top-neighboring luma sample region block for use when performing ALC. Similarly, in this example, video encoder 20 or video decoder 30 is configured to determine a middle 4×4 left-neighboring luma sample block for use when performing ALC.

In another alternative, regardless the value of N or M, video encoder 20 or video decoder 30 may select the top luma sample region and the left luma sample region as a region having a size of 4×4 luma samples. Alternatively, video encoder 20 or video decoder 30 may select any 4×4 region inside the N×4 and 4×M region.

Figure 7A:
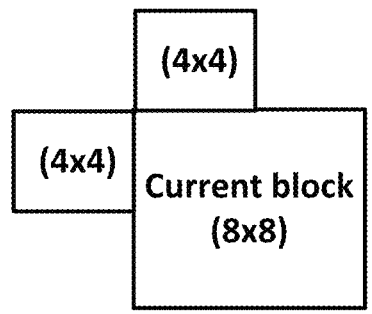
FIGS. 7A-7B are conceptual diagrams illustrating examples of adaptive luminance compensation techniques in accordance with the techniques of this disclosure.
Figure 7B:
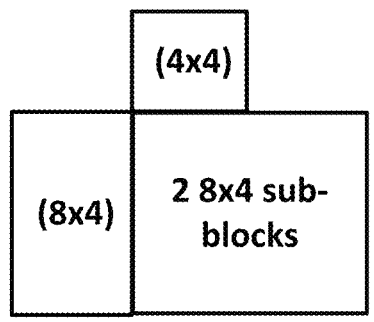

FIGS. 7A-7B are conceptual diagrams illustrating examples of adaptive luminance compensation techniques in accordance with the techniques of this disclosure. As described briefly above with respect to FIG. 1, video encoder 20 or video decoder 30 may be configured to perform macroblock partition-dependent, but sub-block partition independent reference samples identification. In these techniques, video encoder 20 or video decoder 30 may derive one set of ALC weights for each macroblock partition. Video encoder 20 or video decoder 30 may also be configured to jointly filter pixels within a macroblock partition using the one set of weights regardless the sub-block partition. For example, for an 8×8 macroblock partition, if the 8×8 partition is further partitioned into four 4×4 blocks, video encoder 20 or video decoder 30 may use the same set of filter coefficients for all of the four blocks, and may filter the blocks jointly.

In another example illustrated in FIG. 7A, video encoder 20 or video decoder 30 select the top-neighboring and left-neighboring luma sample regions to the top 4×4 and left 4×4 block of the top left 4×4 block of a macroblock partition. In this example, video encoder 20 or video decoder 30 may be configured to use the motion vector of the top- and/or left-neighboring 4×4 luma sample region to determine the location of the predictive block of luma samples from the reference view (e.g., LTRef$_i$ and UTRef$_i$).

In another alternative, if a macroblock partition has a size of M×N, and M or N is larger than 8×8, or M or N has a size equal to 8×8, but has a sub-block partition is 8×8, video encoder 20 or video decoder 30 may select the left luma reference sample region such that the region has a size of 4×N and a region of top reference samples such that the top reference sample region has a size of M×4. Video encoder 20 or video decoder 30 may also select the left reference samples region such that the left luma reference sample region has a size of 4×8 and the right reference sample region such that the right luma reference sample region has a size of 8×4. Video encoder 20 or video decoder 30 such that the left and top luma reference sample regions have a size of 4×N/2 and M/2×4, respectively.

In various examples, such as those illustrated in FIG. 7B, video encoder 20 or video decoder 30 may perform macroblock partition-dependent and sub-block partition dependent reference samples identification. In the example of FIG. 7B, video encoder 20 or video decoder 30 derive one set of ALC prediction weights for each MB partition. However, video encoder 20 or video decoder 30 may utilize different techniques to identify the reference samples for each sub-block partition. If the macroblock partition is an 8×8 partition, and the sub-block partition has a size of either: two 8×4 (m×n) blocks or two 4×8 (m×n) blocks, video encoder 20 or video decoder 30 may select the left reference samples region such that the left-neighboring reference samples region has a size of 4×n and the top reference luma samples a size of m×4.

In one alternative, if the macroblock partition is of size 8×8 and the sub-block partition is either two 8×4 (m×n) blocks or two 4×8 (m×n) blocks, video encoder 20 or video decoder 30 may determine the motion vector indicative of the location of the predictive block of luma samples for the current block based on one of the motion vectors indicative of the locations of the top- or left-neighboring blocks of reference luma samples. In another alternative, video encoder 20 or video decoder 30 may utilize the motion vectors that indicate the location of the top- and/or left-neighboring reference sample blocks when determining motion vector indicative of the predictive block of luma samples for the current block.

The techniques described in the modifications to the 3D-AVC working draft include techniques that cause a coder configured in accordance with the techniques of this disclosure to perform motion compensation to determine weights for ALC only once per macroblock partition. The video coder then uses the same motion vector to determine the reference luma samples for each macroblock partition and any sub-partitions within the macroblock partition.

Figure 8:
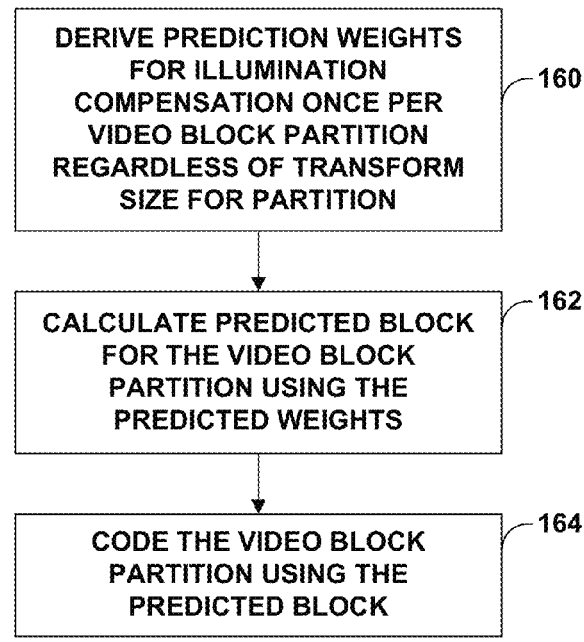
FIG. 8 is a flowchart illustrating an example operation of a video coding device in configured to perform adaptive luminance compensation techniques in accordance with the techniques of this disclosure.

FIG. 8 is a flowchart illustrating an example operation of a video coding device in configured to perform adaptive luminance compensation techniques in accordance with the techniques of this disclosure. For purpose of this example, it should be understood that a video coder, such as video encoder 20 or video decoder 30 may perform the method of FIG. 8.

In the method of FIG. 8, video encoder 20 or video decoder 30 may derive prediction weights for illumination compensation of luma samples of a video block partition once per video block partition such that the video block partition has a common set of prediction weights for performing illumination compensation of the luma samples regardless of transform size of the luma samples for the video block partition (160).

In the method of FIG. 8, video encoder 20 or video decoder 30 may further be configured to calculate a predicted block for the video block partition using the prediction weights using illumination compensation (162), and code the video block partition using the predicted block (164).

To derive the common set of prediction weights, video encoder 20 or video decoder 30 may further be configured to derive the common set of prediction weights using luma samples from at most N×4 samples of a top-neighboring block, and use luma samples from at most 4×M samples of a left-neighboring block. In this example, N is a width and M is a height, an N and M are less than or equal to 16.

In various examples, the top-neighboring block has a height of 1 row of luma samples, and the left-neighboring block has a width of 1 column of luma samples. In some examples, the top-neighboring block may include only a first subset of luma samples from the 1 row of luma samples, and the left-neighboring block may include only a second subset of luma samples from the 1 column of luma samples.

In some examples, the top-neighboring block includes only luma samples from left and right ends of the luma samples, and the left-neighboring block includes only luma samples from top and bottom ends of the 1 column of luma samples. In some other examples, one of N and M is one of 4, 8, or 16, and the other of N and M is equal to 16.

In yet another example, the video block partition may have a size equal to N×M, where N is a width, and M is a height. In this example, to derive the prediction weights, video encoder 20 or video decoder 30 may derive the prediction weights using at least one of: a number of columns of pixels in an above-neighboring block based on N, and a number of rows of pixels in a left-neighboring block based on M.

In yet other examples, the N×4 samples of the left-neighboring block may comprise any 4×8 left-neighboring luma samples relative to the video block partition. In another example, the N×4 samples of the left-neighboring block may comprise any 4×4 left-neighboring luma samples relative to the video block partition. In another example, the 4×M samples of the top-neighboring block may comprise any 8×4 left-neighboring luma samples relative to the video block partition. In another example, the 4×M samples of the top-neighboring block may comprise any 4×4 left-neighboring luma samples relative to the video block partition. In still yet other examples, if at least one of N and M is not equal to 4, the top-neighboring block is the leftmost top-neighboring block, and the left-neighboring block is the topmost left-neighboring block In still yet other examples, to derive the prediction weights, video encoder 20 or video decoder 30 may further be configured to derive the prediction weights using end samples and a middle sample of the row of samples or the column of samples. In another example, to derive the prediction weights, video encoder 20 or video decoder 30 may further be configured to derive the prediction weights using at most four samples of the row of samples or the column of samples.

In various examples, to derive the prediction weights, video encoder 20 or video decoder 30 may further be configured to derive the prediction weights using one or more downsampled samples. In another example, to derive the prediction weights, video encoder 20 or video decoder 30 may further be configured to derive the prediction weights using one or more downsampled and filtered samples.

In still other examples, if the partition has a size of 8×8, wherein the common set of prediction weights comprises a single set of prediction weights, video encoder 20 or video decoder 30 may further be configured to derive the single set of prediction weights for illumination compensation of the video block partition based on prediction weights for one block of luma samples of the video block partition.

In another example, the 8×8 partition of luma samples may further comprises at least one sub-partition of 4×4 luma samples, and the one block used to derive the prediction weights may be one of the at least one sub-partitions of 4×4 luma samples. In various examples, the 8×8 partition of luma samples further comprises at least one sub-partition of 4×4 luma samples. In these examples video encoder 20 or video decoder 30 may further be configured to select, as the one block used to derive the prediction weights, one of the at least one sub-partitions of 4×4 luma samples that has a largest motion vector among motion vectors for the sub-partitions.

In another example, the set of prediction weights is based on a set of previously decoded left-neighboring luma samples, and a set of top-neighboring luma samples relative to the video block partition in the same picture as the video block partition, and wherein the set of prediction weights is also based on a set of left-neighboring luma samples and a set of top-neighboring luma samples relative to an inter-view-predictive reference block of luma samples for the video block partition.

In yet another example, video encoder 20 or video decoder 30 may further be configured to: determine an inter-view motion vector for the video block partition, round the inter-view motion vector to an integer pixel, and determine the inter-view-predictive reference block of luma samples based on the half-integer rounded motion vector.

In still other examples, video encoder 20 or video decoder 30 may further be configured to: determine an inter-view motion vector for the video block partition. Video encoder 20 or video decoder 30 may round the inter-view motion vector to a half-integer pixel, and determine the inter-viewpredictive reference block of luma samples based on the half-integer rounded motion vector.

In still other examples, the inter-view-predictive reference block may comprise a first block, and the set of left-neighboring luma samples and the set of top-neighboring luma samples are neighboring relative to a second, different inter-view-reference block determined based on a rounded motion vector that indicates the location of the first block.

In still other examples, the video block partition comprises one video block partition of one or more video block partitions of a full video block, and to derive the common set of prediction weights, video encoder 20 or video decoder 30 is configured to derive the common set of prediction weights once for all of the video block partitions based on the one of the video block partitions that contains a top-left pixel of the full video block.

In another example, the video block partition may comprise a plurality of sub-blocks, and each of the sub-blocks may have a respective motion vector. To derive the common set of prediction weights, video encoder 20 or video decoder 30 is configured to derive the common set of prediction weights once for each of the sub-blocks based on the top-left sub-block of the video block partition.

In yet another example, the video block partition may have a size equal to N×M, and at least one of N and M may be equal to 16. In this example, to derive the prediction weights, video encoder 20 or video decoder 30 is configured to derive the prediction weights using up to N columns of pixels in an above-neighboring block or up to M rows of pixels in a left-neighboring block.

In some examples, video encoder 20 or video decoder 30 may be further configured to perform a filtering operation on the up to N columns of pixels or the up to M rows of pixels to form a set of intermediate samples. In these examples, to derive the prediction weights, video encoder 20 or video decoder 30 may be configured to derive prediction weights based at least in part on the intermediate samples. And, in some examples, to perform the filtering operation, video encoder 20 or video decoder 30 may be configured to perform the filtering operation on samples inside the up to N columns or the up to M rows that can form an 8×4, a 4×8, or a 4×4 region.

In this manner, the method of FIG. 8 represents an example of a method including deriving prediction weights for illumination compensation of luma samples of a video block partition once for the video block partition such that the video block partition has a common set of prediction weights for performing illumination compensation of the luma samples regardless of a transform size for the video block partition, calculating a predicted block for the video block partition using the prediction weights using illumination compensation, and coding (e.g., encoding or decoding) the video block partition using the predicted block.

While certain techniques of this disclosure are described with respect to the H.264 standard, it should be understood that the techniques are not necessarily limited to a particular coding standard. That is, the techniques more generally relate to achieving coding efficiencies in 3DVC, for example, through more efficient processing (e.g., coding) of video data, as described above.

It should be understood that, depending on the example, certain acts or events of any of the methods described herein can be performed in a different sequence, may be added, merged, or left out altogether (e.g., not all described acts or events are necessary for the practice of the method). Moreover, in certain examples, acts or events may be performed concurrently, e.g., through multi-threaded processing, interrupt processing, or multiple processors, rather than sequentially. In addition, while certain aspects of this disclosure are described as being performed by a single module or unit for purposes of clarity, it should be understood that the techniques of this disclosure may be performed by a combination of units or modules associated with a video coder.

In one or more examples, the functions described may be implemented in hardware, software, firmware, or any combination thereof. If implemented in software, the functions may be stored on or transmitted over as one or more instructions or code on a computer-readable medium and executed by a hardware-based processing unit. Computer-readable media may include computer-readable storage media, which corresponds to a tangible medium such as data storage media, or communication media including any medium that facilitates transfer of a computer program from one place to another, e.g., according to a communication protocol.

In this manner, computer-readable media generally may correspond to (1) tangible computer-readable storage media which is non-transitory or (2) a communication medium such as a signal or carrier wave. Data storage media may be any available media that can be accessed by one or more computers or one or more processors to retrieve instructions, code and/or data structures for implementation of the techniques described in this disclosure. A computer program product may include a computer-readable medium.

By way of example, and not limitation, such computer-readable storage media can comprise RAM, ROM, EEPROM, CD-ROM or other optical disk storage, magnetic disk storage, or other magnetic storage devices, flash memory, or any other medium that can be used to store desired program code in the form of instructions or data structures and that can be accessed by a computer. Also, any connection is properly termed a computer-readable medium. For example, if instructions are transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium.

It should be understood, however, that computer-readable storage media and data storage media do not include connections, carrier waves, signals, or other transient media, but are instead directed to non-transient, tangible storage media. Disk and disc, as used herein, includes compact disc (CD), laser disc, optical disc, digital versatile disc (DVD), floppy disk and blu-ray disc where disks usually reproduce data magnetically, while discs reproduce data optically with lasers. Combinations of the above should also be included within the scope of computer-readable media.

Instructions may be executed by one or more processors, such as one or more digital signal processors (DSPs), general purpose microprocessors, application specific integrated circuits (ASICs), field programmable logic arrays (FPGAs), or other equivalent integrated or discrete logic circuitry. Accordingly, the term "processor," as used herein may refer to any of the foregoing structure or any other structure suitable for implementation of the techniques described herein. In addition, in some aspects, the functionality described herein may be provided within dedicated hardware and/or software modules configured for encoding and decoding, or incorporated in a combined codec. Also, the techniques could be fully implemented in one or more circuits or logic elements.

The techniques of this disclosure may be implemented in a wide variety of devices or apparatuses, including a wireless handset, an integrated circuit (IC) or a set of ICs (e.g., a chip set). Various components, modules, or units are described in this disclosure to emphasize functional aspects of devices configured to perform the disclosed techniques, but do not necessarily require realization by different hardware units. Rather, as described above, various units may be combined in a codec hardware unit or provided by a collection of interoperative hardware units, including one or more processors as described above, in conjunction with suitable software and/or firmware.

Various aspects of the disclosure have been described. These and other aspects are within the scope of the following claims.

What is claimed is:

1. A method of coding video data, the method comprising:
    deriving, by a video coder, prediction weights, based on a size of a video block partition and not based on a transform size for the video block partition, for illumination compensation of luma samples of the video block partition once for the video block partition such that the video block partition has a common set of prediction weights amongst the luma samples for performing illumination compensation of the luma samples;
    calculating, by the video coder, a predicted block for the video block partition using the prediction weights using illumination compensation; and
    coding, by the video coder, the video block partition using the predicted block.

2. The method of claim 1, wherein coding video data comprises decoding video data, and wherein coding the video block partition comprises decoding the video block partition.

3. The method of claim 1, wherein coding video data comprises encoding video data, and wherein coding the video block partition comprises encoding the video block partition.

4. The method of claim 1, wherein deriving the common set of prediction weights comprises deriving the common set of prediction weights using luma samples from at most N×4 samples of a top-neighboring block, and using luma samples from at most 4×M samples of a left-neighboring block,
    wherein N is a width and M is a height, and
    wherein N and M are less than or equal to 16.

5. The method of claim 4,
    wherein the top-neighboring block has a height of 1 row of luma samples,
    wherein the left-neighboring block has a width of 1 column of luma samples.

6. The method of claim 5,
    wherein the top-neighboring block includes only a first subset of luma samples from the 1 row of luma samples, and
    wherein the left-neighboring block includes only a second subset of luma samples from the 1 column of luma samples.

7. The method of claim 5, wherein the top-neighboring block includes only luma samples from left and right ends of the luma samples, and
    wherein the left-neighboring block includes only luma samples from top and bottom ends of the 1 column of luma samples.

8. The method of claim 4, wherein one of N and M is one of 4, 8, or 16, and the other of N and M is equal to 16.

9. The method of claim 4, wherein the N×4 samples of the left-neighboring block comprise any 4×8 left-neighboring luma samples relative to the video block partition.

10. The method of claim 4, wherein the N×4 samples of the left-neighboring block comprise any 4×4 left-neighboring luma samples relative to the video block partition.

11. The method of claim 4, wherein the 4×M samples of the top-neighboring block comprise any 8×4 left-neighboring luma samples relative to the video block partition.

12. The method of claim 4, wherein the 4×M samples of the top-neighboring block comprise any 4×4 left-neighboring luma samples relative to the video block partition.

13. The method of claim of claim 4,
    wherein at least one of N or M is not equal to 4,
    wherein the top-neighboring block is a leftmost top-neighboring block, and
    wherein the left-neighboring block is a topmost left-neighboring block.

14. The method of claim 4, wherein deriving the prediction weights comprises deriving the prediction weights using samples from left and right ends and a middle of the top-neighboring block, and samples from top and bottom ends, and a middle of the left-neighboring block.

15. The method of claim 4, wherein deriving the prediction weights comprises deriving the prediction weights using at most four samples of the row of samples or the column of samples.

16. The method of claim 4, wherein deriving the prediction weights comprises deriving the prediction weights using one or more downsampled samples.

17. The method of claim 4, wherein deriving the prediction weights comprises deriving the prediction weights using one or more downsampled and filtered samples.

18. The method of claim 1, wherein the video block partition has a size of 8×8, wherein the common set of prediction weights comprises a single set of prediction weights, the method further comprising deriving the single set of prediction weights for illumination compensation of the video block partition based on prediction weights for one block of luma samples of the video block partition.

19. The method of claim 18, wherein the 8×8 video block partition of luma samples further comprises at least one sub-partition of 4×4 luma samples, and wherein the one block used to derive the prediction weights comprises one of the at least one sub-partitions of 4×4 luma samples.

20. The method of claim 18, wherein the 8×8 video block partition of luma samples further comprises at least one sub-partition of 4×4 luma samples, the method further comprising selecting, as the one block used to derive the prediction weights, one of the at least one sub-partitions of 4×4 luma samples that has a largest motion vector among motion vectors for the sub-partitions.

21. The method of claim 1, wherein the set of prediction weights is based on a set of previously decoded left-neighboring luma samples, and a set of top-neighboring luma samples relative to the video block partition in the same picture as the video block partition, and wherein the set of prediction weights is also based on a set of left-neighboring luma samples and a set of top-neighboring luma samples relative to an inter-view-predictive reference block of luma samples for the video block partition.

22. The method of claim 21, further comprising:
    determining an inter-view motion vector for the video block partition;
    rounding the inter-view motion vector to an integer pixel; and determining the inter-view-predictive reference block of luma samples based on the half-integer rounded motion vector.

23. The method of claim 21, further comprising:
determining an inter-view motion vector for the video block partition;
rounding the inter-view motion vector to a half-integer pixel; and
determining the inter-view-predictive reference block of luma samples based on the half-integer rounded motion vector.

24. The method of claim 21,
wherein the inter-view-predictive reference block comprises a first block,
wherein the set of left-neighboring luma samples and the set of top-neighboring luma samples are neighboring relative to a second, different inter-view-reference block determined based on a rounded motion vector that indicates the location of the first block.

25. The method of claim 1, wherein the video block partition comprises one video block partition of one or more video block partitions of a full video block, and wherein deriving the common set of prediction weights comprises deriving the common set of prediction weights once for all of the video block partitions of the full video block based on the one video block partition of the one or more video block partitions of the full video block that contains a top-left pixel of the full video block.

26. The method of claim 1, wherein the video block partition comprises a plurality of sub-blocks, each of the sub-blocks having a respective motion vector, and wherein deriving the common set of prediction weights comprises deriving the common set of prediction weights once for each of the sub-blocks based on the top-left sub-block of the video block partition.

27. The method of claim 1, wherein the video block partition has a size equal to N×M and at least one of N or M is equal to 16, and wherein deriving the prediction weights comprises deriving the prediction weights using up to N columns of pixels in an above-neighboring block or up to M rows of pixels in a left-neighboring block.

28. The method of claim 27, further comprising performing a filtering operation on the up to N columns of pixels or the up to M rows of pixels to form a set of intermediate samples, wherein deriving the prediction weights comprises deriving the prediction weights based at least in part on the intermediate samples.

29. The method of claim 28, wherein performing the filtering operation comprises performing the filtering operation on samples inside the up to N columns or the up to M rows that can form an 8×4, a 4×8, or a 4×4 region.

30. The method of claim 1, wherein the video block partition has a size equal to N×M,
wherein N is a width, and M is a height, and
wherein deriving the prediction weights comprises deriving the prediction weights using at least one of: a number of columns of pixels in an above-neighboring block based on N, or a number of rows of pixels in a left-neighboring block based on M.

31. A device comprising a video coder configured to:
derive prediction weights, based on a size of a video block partition and not based on a transform size for the video block partition, for illumination compensation of luma samples of the video block partition once for the video block partition such that the video block partition has a common set of prediction weights amongst the luma samples for performing illumination compensation of the luma samples;
calculate a predicted block for the video block partition using the prediction weights using illumination compensation; and
code the video block partition using the predicted block.

32. The device of claim 31, wherein to derive the common set of prediction weights, the video coder is configured to derive the common set of prediction weights using luma samples from at most N×4 samples of a top-neighboring block, and use luma samples from at most 4×M samples of a left-neighboring block,
wherein N is a width and M is a height, and
wherein N and M are less than or equal to 16.

33. The device of claim 32,
wherein the top-neighboring block has a height of 1 row of luma samples,
wherein the left-neighboring block has a width of 1 column of luma samples.

34. The device of claim 33,
wherein the top-neighboring block includes only a first subset of luma samples from the 1 row of luma samples, and
wherein the left-neighboring block includes only a second subset of luma samples from the 1 column of luma samples.

35. The device of claim 33, wherein the top-neighboring block includes only luma samples from left and right ends of the luma samples, and
wherein the left-neighboring block includes only luma samples from top and bottom ends of the 1 column of luma samples.

36. The device of claim 32, wherein one of N and M is one of 4, 8, or 16, and the other of N and M is equal to 16.

37. The device of claim 32, wherein the N×4 samples of the left-neighboring block comprise any 4×8 left-neighboring luma samples relative to the video block partition.

38. The device of claim 32, wherein the N×4 samples of the left-neighboring block
comprise any 4×4 left-neighboring luma samples relative to the video block partition.

39. The device of claim 32, wherein the 4×M samples of the top-neighboring block comprise any 8×4 left-neighboring luma samples relative to the video block partition.

40. The device of claim 32, wherein the 4×M samples of the top-neighboring block
comprise any 4×4 left-neighboring luma samples relative to the video block partition.

41. The device of claim of claim 32,
wherein at least one of N or M is not equal to 4,
wherein the top-neighboring block is a leftmost top-neighboring block, and
wherein the left-neighboring block is a topmost left-neighboring block.

42. The device of claim 32, wherein to derive the prediction weights, the video coder is configured to derive the prediction weights using samples from left and right ends and a middle of the top-neighboring block, and samples from top and bottom ends, and a middle of the left-neighboring block.

43. The device of claim 32, wherein to derive the prediction weights, the video coder is configured to derive the prediction weights using at most four samples of the row of samples or the column of samples.

44. The device of claim 32, wherein to derive the prediction weights, the video coder is configured to derive the prediction weights using one or more downsampled samples.

45. The device of claim 32, wherein to derive the prediction weights, the video coder is configured to derive the prediction weights using one or more downsampled and filtered samples.

46. The device of claim 31, wherein the video block partition has a size of 8×8, wherein the common set of prediction weights comprises a single set of prediction weights, the video coder further configured to derive the single set of prediction weights for illumination compensation of the video block partition based on prediction weights for one block of luma samples of the video block partition.

47. The device of claim 46, wherein the 8×8 video block partition of luma samples further comprises at least one sub-partition of 4×4 luma samples, and wherein the one block used to derive the prediction weights comprises one of the at least one sub-partitions of 4×4 luma samples.

48. The device of claim 46, wherein the 8×8 video block partition of luma samples further comprises at least one sub-partition of 4×4 luma samples, the video coder further configured to select, as the one block used to derive the prediction weights, one of the at least one sub-partitions of 4×4 luma samples that has a largest motion vector among motion vectors for the sub-partitions.

49. The device of claim 31, wherein the set of prediction weights is based on a set of previously decoded left-neighboring luma samples, and a set of top-neighboring luma samples relative to the video block partition in the same picture as the video block partition, and wherein the set of prediction weights is also based on a set of left-neighboring luma samples and a set of top-neighboring luma samples relative to an inter-view-predictive reference block of luma samples for the video block partition.

50. The device of claim 49, wherein the video coder is further configured to:
   determine an inter-view motion vector for the video block partition;
   round the inter-view motion vector to an integer pixel; and
   determine the inter-view-predictive reference block of luma samples based on the half-integer rounded motion vector.

51. The device of claim 49, wherein the video coder is further configured to:
   determine an inter-view motion vector for the video block partition;
   round the inter-view motion vector to a half-integer pixel; and
   determine the inter-view-predictive reference block of luma samples based on the half-integer rounded motion vector.

52. The device of claim 49,
   wherein the inter-view-predictive reference block comprises a first block,
   wherein the set of left-neighboring luma samples and the set of top-neighboring luma samples are neighboring relative to a second, different inter-view-reference block determined based on a rounded motion vector that indicates the location of the first block.

53. The device of claim 31, wherein the video block partition comprises one video block partition of one or more video block partitions of a full video block, and wherein to derive the common set of prediction weights, the video coder is configured to derive the common set of prediction weights once for all of the video block partitions of the full video block based on the one video block partition of the one or more video block partitions that contains a top-left pixel of the full video block.

54. The device of claim 31, wherein the video block partition comprises a plurality of sub-blocks, each of the sub-blocks having a respective motion vector, and wherein to derive the common set of prediction weights, the video coder is configured to derive the common set of prediction weights once for each of the sub-blocks based on the top-left sub-block of the video block partition.

55. The device of claim 31, wherein the video block partition has a size equal to N×M and at least one of N or M is equal to 16, and wherein to derive the prediction weights, the video coder is configured to derive the prediction weights using up to N columns of pixels in an above-neighboring block or up to M rows of pixels in a left-neighboring block.

56. The device of claim 55, wherein the video coder is further configured to perform a filtering operation on the up to N columns of pixels or the up to M rows of pixels to form a set of intermediate samples, wherein to derive the prediction weights, the video coder is configured to derive prediction weights based at least in part on the intermediate samples.

57. The device of claim 56, wherein to perform the filtering operation, the video coder is configured to perform the filtering operation on samples inside the up to N columns or the up to M rows that can form an 8×4, a 4×8, or a 4×4 region.

58. The device of claim 31, wherein the video block partition has a size equal to N×M,
   wherein N is a width, and M is a height, and
   wherein to derive the prediction weights, the video coder is configured to derive the prediction weights using at least one of: a number of columns of pixels in an above-neighboring block based on N, or a number of rows of pixels in a left-neighboring block based on M.

59. A non-transitory computer-readable storage medium comprising instructions stored thereon that, when executed, cause at least one processor to:
   derive prediction weights, based on a size of a video block partition and not based on a transform size for the video block partition, for illumination compensation of luma samples of the video block partition once for the video block partition such that the video block partition has a common set of prediction weights amongst the luma samples for performing illumination compensation of the luma samples;
   calculate a predicted block for the video block partition using the prediction weights using illumination compensation; and
   code the video block partition using the predicted block.

60. The non-transitory computer-readable storage medium of claim 59, wherein the instructions that cause the at least one processor to derive the common set of prediction weights further comprise instructions that, when executed, cause the at least one processor to derive the common set of prediction weights using luma samples from at most N×4 samples of a top-neighboring block, and use luma samples from at most 4×M samples of a left-neighboring block,
   wherein N is a width and M is a height, and
   wherein N and M are less than or equal to 16.

61. The non-transitory computer-readable storage medium of claim 59, wherein the video block partition has a size equal to N×M and at least one of N or M is equal to 16, and wherein the instructions that cause the at least one processor to derive the prediction weights further comprise instructions that, when executed, cause the at least one processor to derive the prediction weights using up to N columns of pixels in an above-neighboring block or up to M rows of pixels in a left-neighboring block.

62. The non-transitory computer readable storage medium of claim 59, wherein the video block partition has a size equal to N×M, wherein N is a width, and M is a height, and wherein the instructions that cause the at least one processor to derive the prediction weights comprise instructions that cause the at least one processor to derive the prediction weights using at least one of: a number of columns of pixels in an above-neighboring block based on N, or a number of rows of pixels in a left-neighboring block based on M.

63. A device for coding video data, the device comprising:

means for deriving prediction weights, based on a size of a video block partition and not based on a transform size for the video block partition, for illumination compensation of luma samples of the video block partition once for the video block partition such that the video block partition has a common set of prediction weights amongst the luma samples for performing illumination compensation of the luma samples;

means for calculating a predicted block for the video block partition using the prediction weights using illumination compensation; and means for encoding the video block partition using the predicted block.

64. The device of claim 63, wherein the means for deriving the common set of prediction weights comprises means for deriving the common set of prediction weights using luma samples from at most N×4 samples of a top-neighboring block, and means for using luma samples from at most 4×M samples of a left-neighboring block, wherein N is a width and M is a height, and wherein N and M are less than or equal to 16.

65. The device of claim 63, wherein the video block partition has a size equal to N×M and at least one of N or M is equal to 16, and wherein the means for deriving the prediction weights comprises means for deriving the prediction weights using up to N columns of pixels in an above-neighboring block or up to M rows of pixels in a left-neighboring block.

66. The device of claim 63, wherein the video block partition has a size equal to N×M, wherein N is a width, and M is a height, and wherein the means for deriving the prediction weights comprises means for deriving the prediction weights using at least one of: a number of columns of pixels in an above-neighboring block based on N, or a number of rows of pixels in a left-neighboring block based on M.

* * * * *